United States Patent
Cheng et al.

(10) Patent No.: US 10,564,462 B2
(45) Date of Patent: Feb. 18, 2020

(54) TOUCH SENSOR AND DISPLAY DEVICE

(71) Applicant: Japan Display Inc., Tokyo (JP)

(72) Inventors: Hsiang-Yuan Cheng, Tokyo (JP);
Hajime Akimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/638,568

(22) Filed: Jun. 30, 2017

(65) Prior Publication Data

US 2018/0024393 A1    Jan. 25, 2018

(30) Foreign Application Priority Data

Jul. 19, 2016 (JP) ................ 2016-141295

(51) Int. Cl.
| | | |
|---|---|---|
| *G06F 3/041* | (2006.01) | |
| *G02F 1/1333* | (2006.01) | |
| *G06F 3/047* | (2006.01) | |
| *G06F 3/044* | (2006.01) | |

(52) U.S. Cl.
CPC .......... *G02F 1/13338* (2013.01); *G06F 3/044* (2013.01); *G06F 3/047* (2013.01); *G06F 3/0412* (2013.01); *G06F 3/0416* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 9,660,003 B2 | 5/2017 | Sato et al. | |
| 2001/0043200 A1* | 11/2001 | Sandbach | G01L 1/205 |
| | | | 345/173 |
| 2002/0134116 A1* | 9/2002 | Sandbach | G06F 3/023 |
| | | | 66/202 |
| 2002/0135457 A1* | 9/2002 | Sandbach | G06F 3/023 |
| | | | 338/47 |
| 2002/0187697 A1* | 12/2002 | Kiryuschev | D03D 15/00 |
| | | | 442/181 |
| 2003/0119391 A1* | 6/2003 | Swallow | D02G 3/38 |
| | | | 442/6 |

(Continued)

FOREIGN PATENT DOCUMENTS

| | | |
|---|---|---|
| JP | 2010-085378 A | 4/2010 |
| JP | 2015-018331 A | 1/2015 |
| JP | 2015-050245 A | 3/2015 |

*Primary Examiner* — Carl Adams
(74) *Attorney, Agent, or Firm* — Michael Best & Friedrich LLP

(57) ABSTRACT

Disclosed is a touch sensor including a first layer, a second layer over the first layer, and a third layer over the second layer. The first layer has a plurality of first insulators arranged in a stripe form and extending in a first direction, and a plurality of first wirings arranged in a stripe form and extending in a second direction intersecting with the first direction. The second layer includes an insulating material. The third layer has a plurality of second insulators arranged in a stripe form and extending in the second direction, and a plurality of second wirings arranged in a stripe form and extending in the first direction. The plurality of first insulators and the plurality of the first wirings are woven with each other, and the plurality of second insulators and the plurality of the second wirings are woven with each other.

6 Claims, 22 Drawing Sheets

(56) References Cited

U.S. PATENT DOCUMENTS

| | | | |
|---|---|---|---|
| 2003/0205450 A1* | 11/2003 | Divigalpitiya | H01H 1/029 200/512 |
| 2011/0128114 A1* | 6/2011 | Kimura | G06F 3/045 338/13 |
| 2011/0315536 A1* | 12/2011 | Chiou | G06F 3/043 200/600 |
| 2012/0086661 A1* | 4/2012 | Shi | G06F 3/041 345/173 |

* cited by examiner

220

240

220

240

430

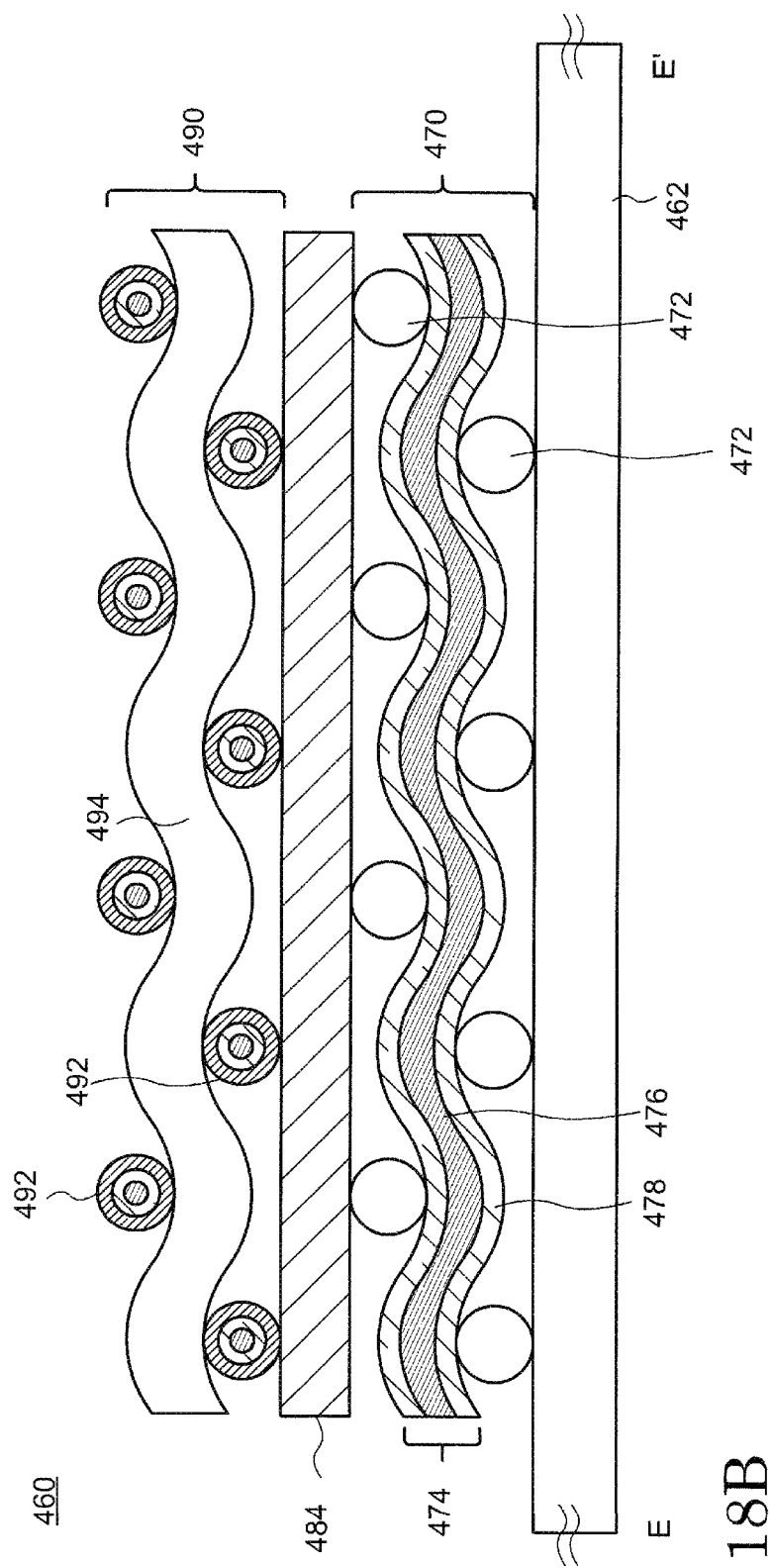
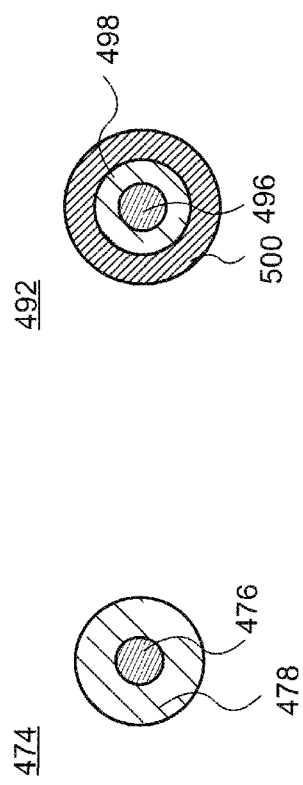

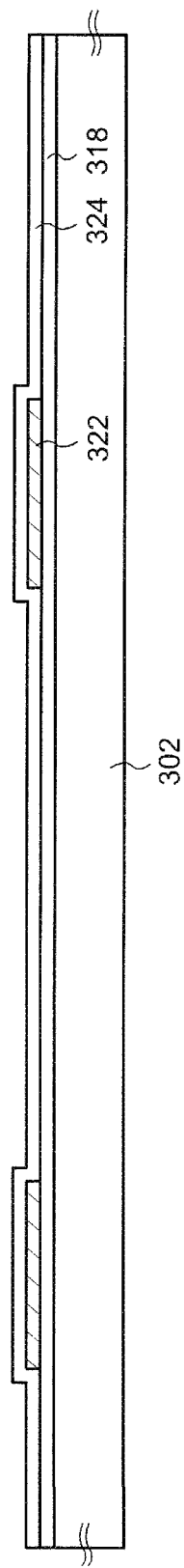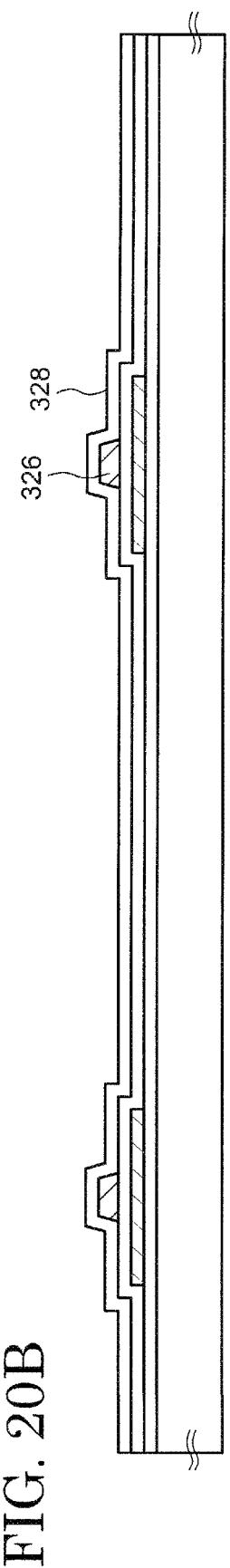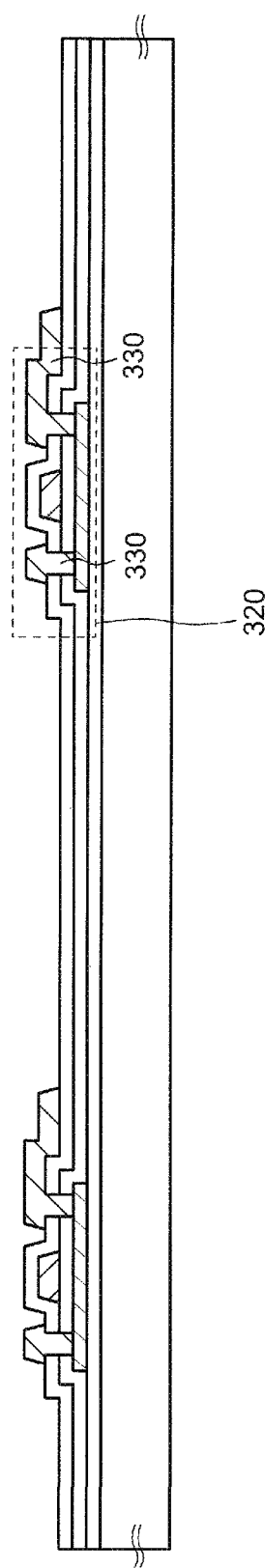

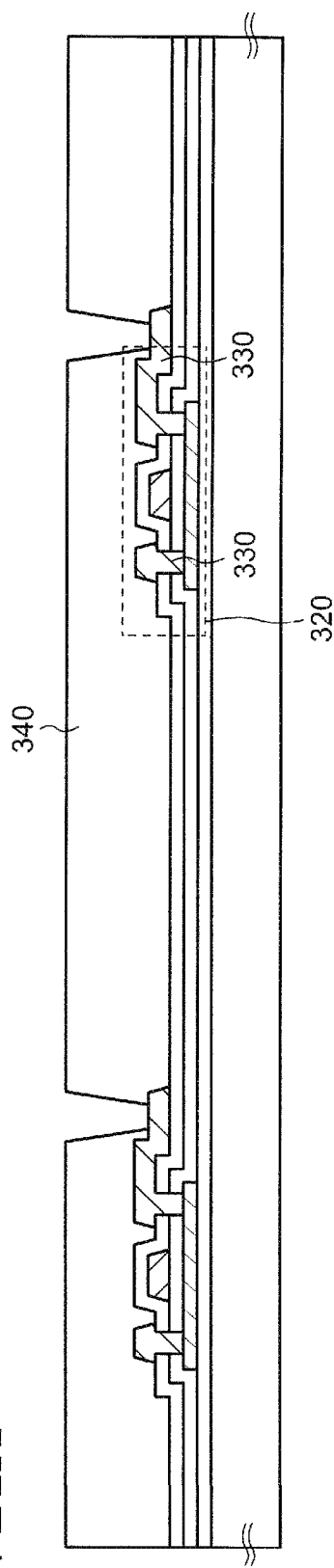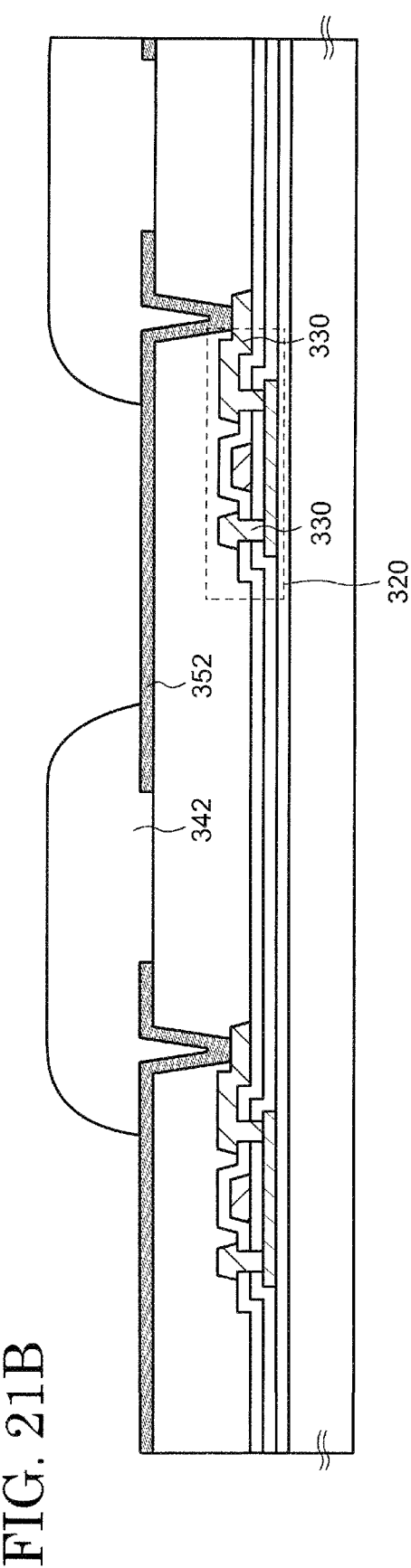

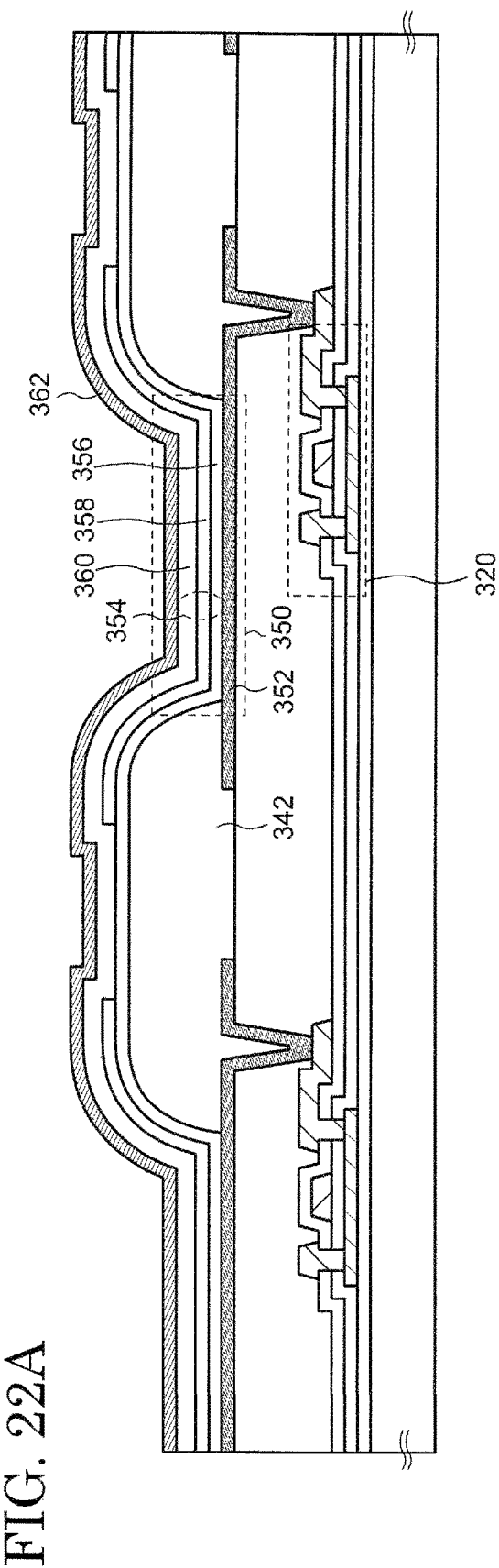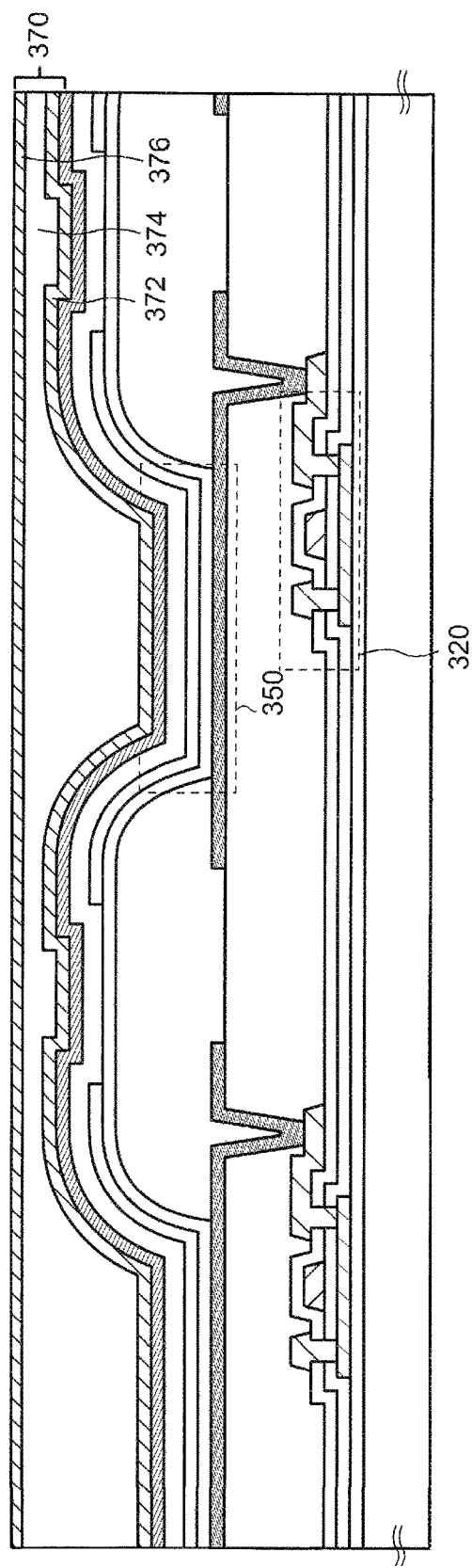

TOUCH SENSOR AND DISPLAY DEVICE

CROSS REFERENCE TO RELATED APPLICATIONS

This application is based on and claims the benefit of priority from the prior Japanese Patent Application No. 2016-141295, filed on Jul. 19, 2016, the entire contents of which are incorporated herein by reference.

FIELD

An embodiment of the present invention relates to a touch sensor and a manufacturing method thereof or a display device on which a touch sensor is mounted and a manufacturing method thereof.

BACKGROUND

A touch sensor has been known as an interface for a user to input information to a display device. Provision of a touch sensor on a display device allows a user to directly operate input buttons and icons displayed on a screen, by which information can be readily input to an electronic device through a display device. For example, in Japanese Patent Application Publications No. 2015-18331, No. 2015-50245, and No. 2010-85378, a display device to which a touch sensor is installed on a display panel having light-emitting elements utilizing electroluminescence is disclosed. Japanese Patent Application Publication No. 2015-18331 discloses a touch sensor having a structure in which a plurality of wirings intersecting with each other is interwoven.

SUMMARY

An embodiment of the present invention is a touch sensor including a first layer, a second layer over the first layer, and a third layer over the second layer. The first layer has a plurality of first insulators arranged in a stripe form and extending in a first direction, and a plurality of first wirings arranged in a stripe form and extending in a second direction intersecting with the first direction. The second layer includes an insulating material. The third layer has a plurality of second insulators arranged in a stripe form and extending in the second direction, and a plurality of second wirings arranged in a stripe form and extending in the first direction. The plurality of first insulators and the plurality of the first wirings are woven with each other, and the plurality of second insulators and the plurality of the second wirings are woven with each other.

An embodiment of the present invention is a touch sensor including a plurality of first wirings arranged in a stripe form and extending in a first direction, and a plurality of second wirings arranged in a stripe form and extending in a second direction intersecting with the first direction. The plurality of first wirings and the plurality of second wirings are woven with each other. The plurality of first wirings and the plurality of the second wirings each possess a core including a conductive material and a clad covering the core and including an insulating material.

An embodiment of the present invention is a touch sensor including: a plurality of first wirings arranged in a stripe form and extending in a first direction; and a plurality of second wirings and a plurality of third wirings arranged in a stripe form, extending in a second direction intersecting with the first direction, and alternating with each other. The plurality of first wirings is woven with the plurality of second wirings and the plurality of third wirings. The plurality of first wirings and the plurality of second wirings each have a first core including a conductive material and a first clad covering the first core and including an insulating material. The plurality of third wirings possesses a second core including a conductive material, a second clad covering the second core and including an insulating material, and a third clad covering the second clad and including a conductive material.

BRIEF DESCRIPTION OF DRAWINGS

FIG. 18A and FIG. 18B are respectively schematic cross-sectional views of a touch sensor and a wiring according to an embodiment of the present invention;

FIG. 20A to FIG. 20C are schematic cross-sectional views for explaining a manufacturing method of a display panel of a display device according to an embodiment of the present invention;

FIG. 21A and FIG. 21B are schematic cross-sectional views for explaining a manufacturing method of a display panel of a display device according to an embodiment of the present invention; and FIG. 22A and FIG. 22B are schematic cross-sectional views for explaining a manufacturing method of a display panel of a display device according to an embodiment of the present invention.

DESCRIPTION OF EMBODIMENTS

Hereinafter, the embodiments of the present invention are explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the present invention, when a plurality of films is formed by processing one film, the plurality of films may have functions or rules different from each other. However, the plurality of films originates from a film which is formed as the same layer in the same process. Therefore, the plurality of films is defined as films existing in the same layer.

In the specification and the scope of the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

First Embodiment

Figure 1:
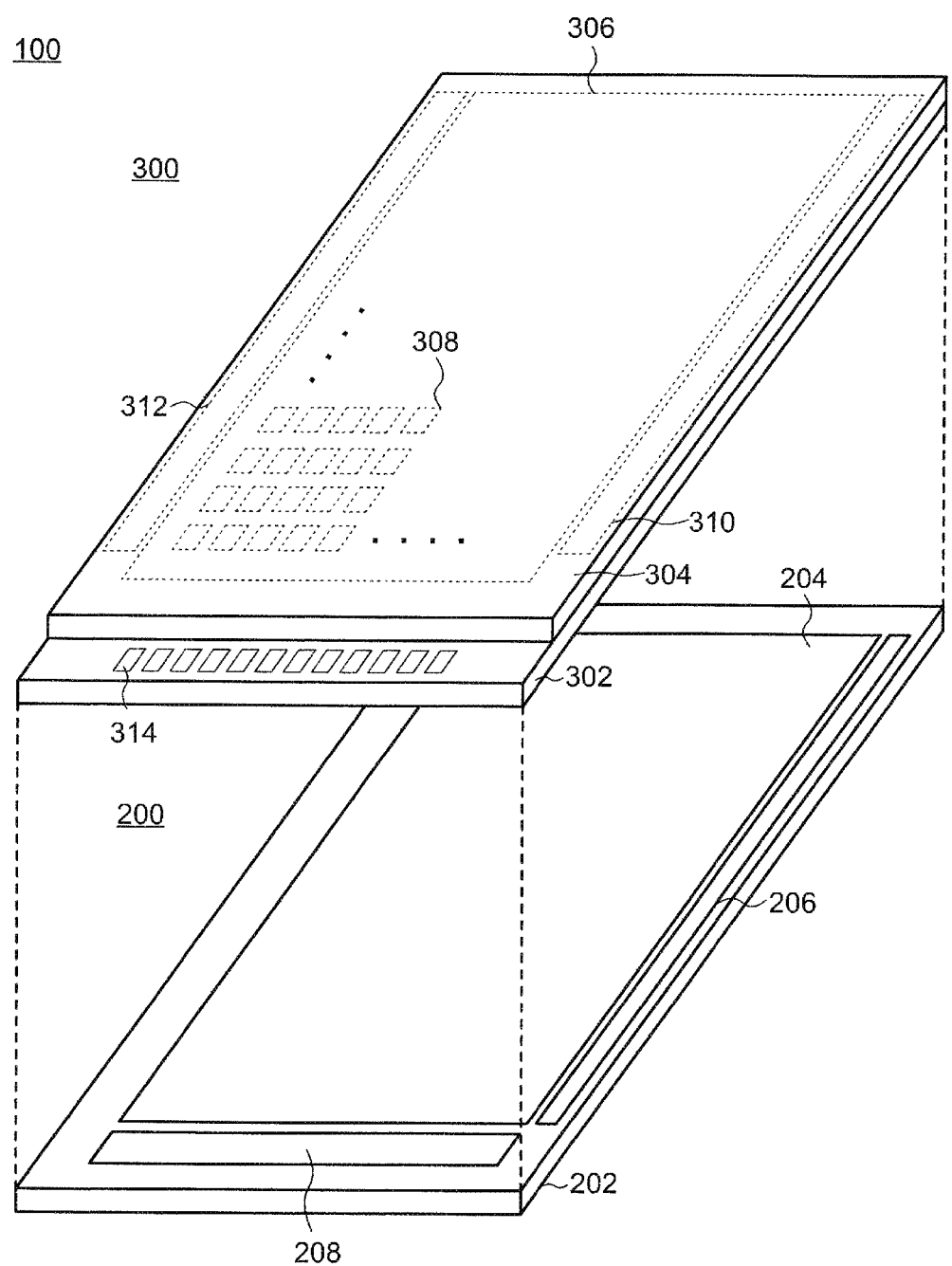
FIG. 1 is a schematic perspective view of a display device according to an embodiment of the present invention.

In the present embodiment, a structure of a display device 100 according to an embodiment of the present invention is explained by using FIG. 1 to FIG. 8.
1. Outline Structure The display device 100 has a touch sensor 200 and a display panel 300 arranged over the touch sensor 200. In FIG. 1, a state is shown where the touch sensor 200 and the display panel 300 are separated. However, the touch sensor 200 and the display panel 300 are bonded with an adhesive and the like. The display panel 300 reproduces an image, and the touch sensor 200 has a function to specify a contact position when a user makes contact to the display 300 and estimate physical force provided to the display device 200 from a user when contacted.

The touch sensor 200 has a sensing region 204 and driver circuits 206 and 208 for driving the sensing region 204 in a peripheral region of the sensing region 204. The driver circuits 206 and 208 have a function to supply signals to a variety of wirings described below in the sensing region 204 or a function to sense variation in voltage applied to the variety of wirings and current flowing in the variety of wirings. A substrate 202 is an optional structure, and the sensing region 204 and the driver circuits 206 and 208 may be formed over the substrate 202. The substrate 202 is able to support the sensing region 204 and the display panel 300 and may include glass, plastics, a metal, or the like, for example. The substrate 202 may possess flexibility. In this case, the substrate 202 may include a polymer such as a polyimide, a polyester, and a polycarbonate. The driver circuits 206 and 208 are not limited in number and may be disposed at each of four sides of the sensing region 204 or on a substrate different from the substrate 202.

The display panel 300 has an array substrate 302 and an opposing substrate 304 over the array substrate 302, and a display region 306 is provided therebetween. As described below in detail, the display region 306 is provided with a plurality of pixels 308 including a display element and a semiconductor element for driving the display element, such as a transistor. An image is reproduced on the display region 306 with the plurality of pixels 308. Driver circuits 310 and 312 may be disposed between the array substrate 302 and the opposing substrate 304 in order to control the pixels 308. Alternatively, the driver circuits 310 and 312 may not be provided between the array substrate 302 and the opposing substrate 304 but may be arranged over a connector (not illustrated) for connecting the display panel 300 to an external circuit.

Figure 2A:
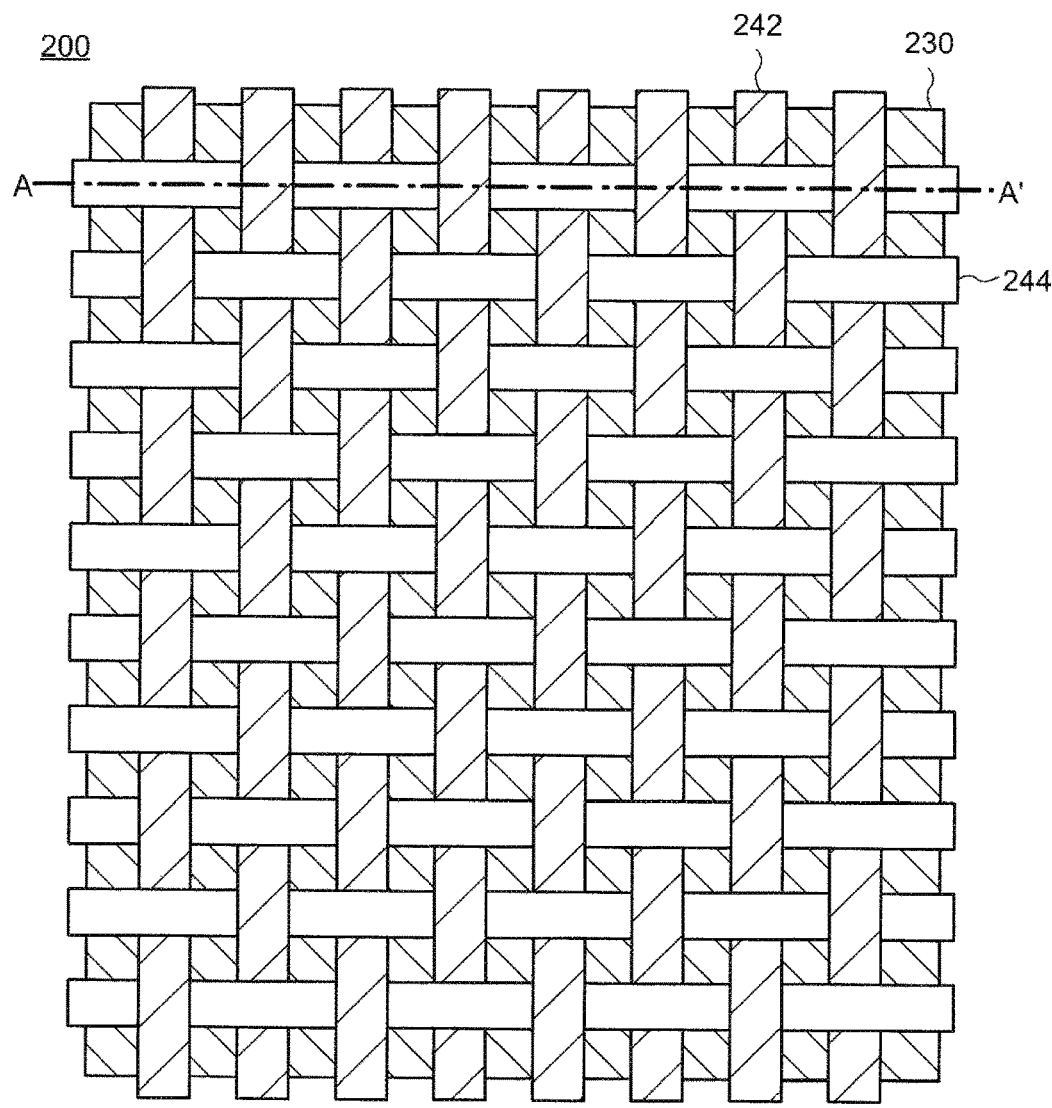
FIG. 2A and FIG. 2B are respectively a schematic top view and cross-sectional view of a touch sensor according to an embodiment of the present invention.
Figure 2B:
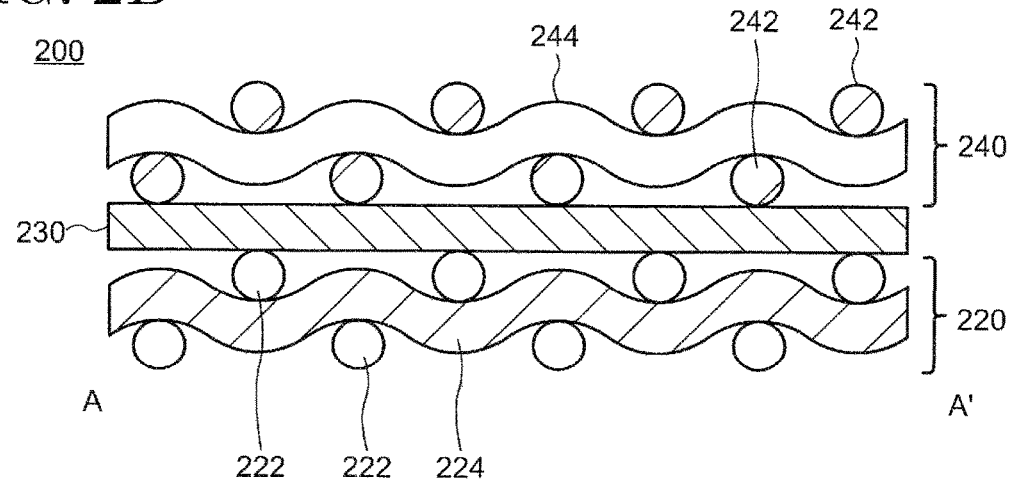

The touch sensor 200 and the display panel 300 overlap with each other, by which the sensing region 204 and the display region 306 are arranged so as to overlap with each other. Therefore, when a user touches the opposing substrate 304 or provides force to the opposing substrate 304 while recognizing an image reproduced in the display region 306, the force is conveyed to the sensing region 204, by which a contact position of the user is specified and the force provided by the user is estimated.
2. Touch Sensor A schematic top view and cross-sectional view of the touch sensor 200 are shown in FIG. 2A and FIG. 2B, respectively. FIG. 2B corresponds to a cross section along a chain line A-A' of FIG. 2A.

As shown in FIG. 2B, the touch sensor 200 possesses a first layer 220, a second layer 230 over the first layer 220, and a third layer 240 over the second layer 230. In order to promote understanding, only the second layer 230 and the third layer 240 are illustrated in FIG. 2A. The first layer 220, the second layer 230, and the third layer 240 overlap with one another.

Figure 3A:
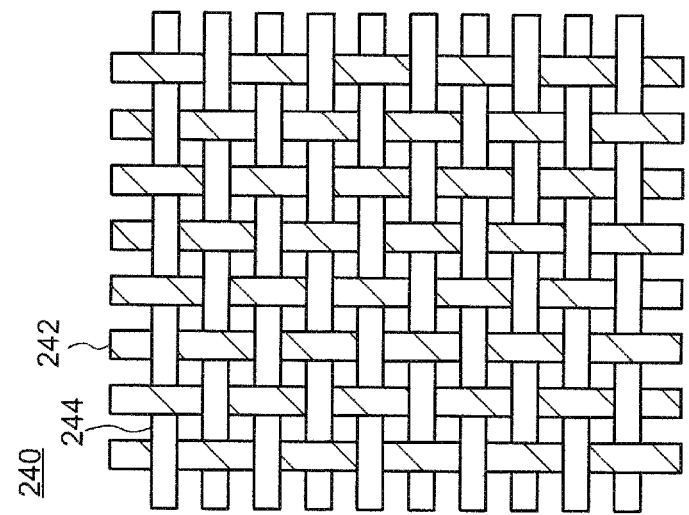
FIG. 3A to FIG. 3C are schematic developed views of a touch sensor according to an embodiment of the present invention.
Figure 3B:
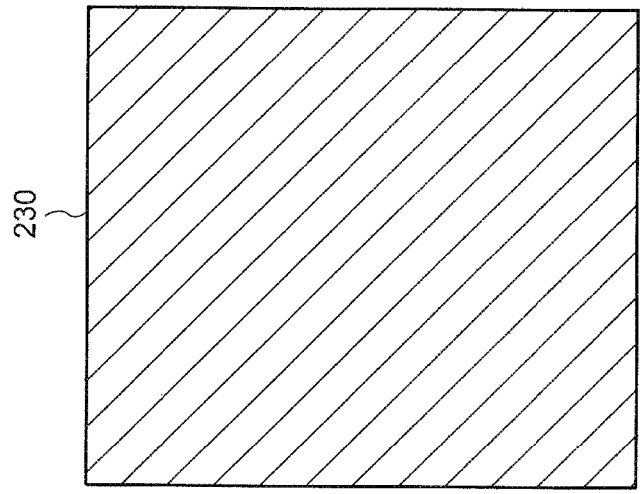
Figure 3C:
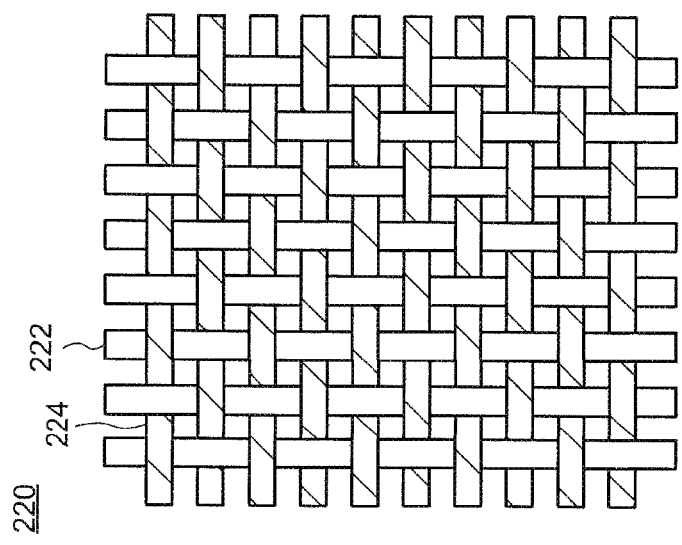

Top views of the first layer 220, the second layer 230, and the third layer 240 obtained by developing the touch sensor 200 are schematically illustrated in FIG. 3A, FIG. 3B, and FIG. 3C, respectively. As shown in FIG. 2B and FIG. 3A, the first layer 220 has a plurality of first insulators 222 arranged in a stripe form and a plurality of first wirings 224 arranged in a stripe form. The first insulators 222 and the first wirings 224 may be in contact with each other. The first insulators 222 extend in a direction (first direction), while the first wirings 224 extend in a direction (second direction) perpendicular to the first direction. The first direction and the second direction may not be perpendicular to each other as long as they intersect with each other. The first insulators 222 and the first wirings 224 are woven with each other and serve as warp and weft, respectively. In the present specification, the warp and the weft interchange with each other depending on a direction of the touch sensor 200 to a user. Thus, the expression of the warp and the weft is merely used for convenience. The first insulators 222 and the first wirings 224 may have a structure in which they are plain-woven as shown in FIG. 3A. In this case, the first insulators 222 and the first wirings 224 alternately intersect with each other. In other words, the first insulators 222 each alternately pass over and under the plurality of first wirings, and the first wirings 224 each alternately pass over and under the plurality of first insulators 222.

The first insulators 222 include an insulating material. An insulating material may be an organic compound or an inorganic compound. An organic compound can be selected from an artificial polymer or a natural polymer. These polymers may be crosslinked intermolecularly or intramolecularly. As an artificial polymer, a polymer having a polyurethane, a polyolefin, a polydiene, a poly(acrylic ester), a poly(methacrylic ester), a polyacrylonitrile, a polysiloxane, a polyester, a polycarbonate, or the like as a basic skeleton is represented. As a natural polymer, natural rubber, plant fiber such as cotton and hemp, animal fiber such as wool and silk, or fiber obtained by processing these fibers is given. As an inorganic compound, glass fiber, rock-wool fiber, ceramic fiber, or fiber including a transition-metal oxide, such as potassium titanate fiber, is exemplified.

The first wirings 224 include a conductive material represented by a metal such as copper, aluminum, silver, titanium, iron, and the like, an alloy thereof, a conductive oxide, carbon fiber, and the like. Alternatively, the aforementioned insulating material may be covered with a conductive material.

These materials are woven as warp and weft and processed to a sheet shape, leading to the formation of the first layer 220.

The second layer 230 is formed over the first layer 220. The second layer 230 may be in contact with the first insulators 222 and the first wirings 224. The second layer 230 includes an insulating material, and a material usable for the first insulators 222 can be used. The insulating material of the second layer 230 may be different from that of the first insulators 222. In this case, the second layer 230 may be processed into a sheet shape, and then disposed over the first layer 220 with a lamination method and the like. Alternatively, the second layer 230 may be formed over the first layer 220 with a wet-type film-formation method such as a spin-coating method and a printing method.

Alternatively, the second layer 230 may include a silicon-containing inorganic compound such as silicon oxide, silicon nitride, silicon oxynitride, and silicon nitride oxide. In addition, a metal oxide of titanium, hafnium, and the like may be used. The second layer 230 including these materials can be formed with a sputtering method, a chemical vapor deposition method (CVD method), and the like.

The third layer 240 may have a similar structure to that of the first layer 220. Specifically, as shown in FIG. 2A, FIG. 2B, and FIG. 3C, the third layer 240 possesses a plurality of second wirings 242 arranged in a stripe form and a plurality of second insulators 244 arranged in a stripe form. The second wirings 242 and the second insulators 244 may be in contact with each other. The second wirings 242 extend in the first direction, whereas the second insulators 244 extend in the second direction. Thus, the plurality of first wirings 224 and the plurality of second wirings 244 perpendicularly intersect with each other with the second layer 230 sandwiched therebetween. The second wirings 242 and the second insulators 244 are woven with each other and serve as warp and weft, respectively. As shown in FIG. 3C, the second wirings 242 and the second insulators 244 may have a structure in which they are plain-woven. In this case, similar to the first layer 220, the second wirings 242 and the second insulators 244 alternately intersect with each other. That is, the second insulators 244 each alternately pass over and under the plurality of second wirings 242, and the second wirings 242 each alternately pass over and under the plurality of insulators 244.

The second wirings 242 and the second insulators 244 may contain the materials of the first wirings 244 and the first insulators 222, respectively.

Figure 4:
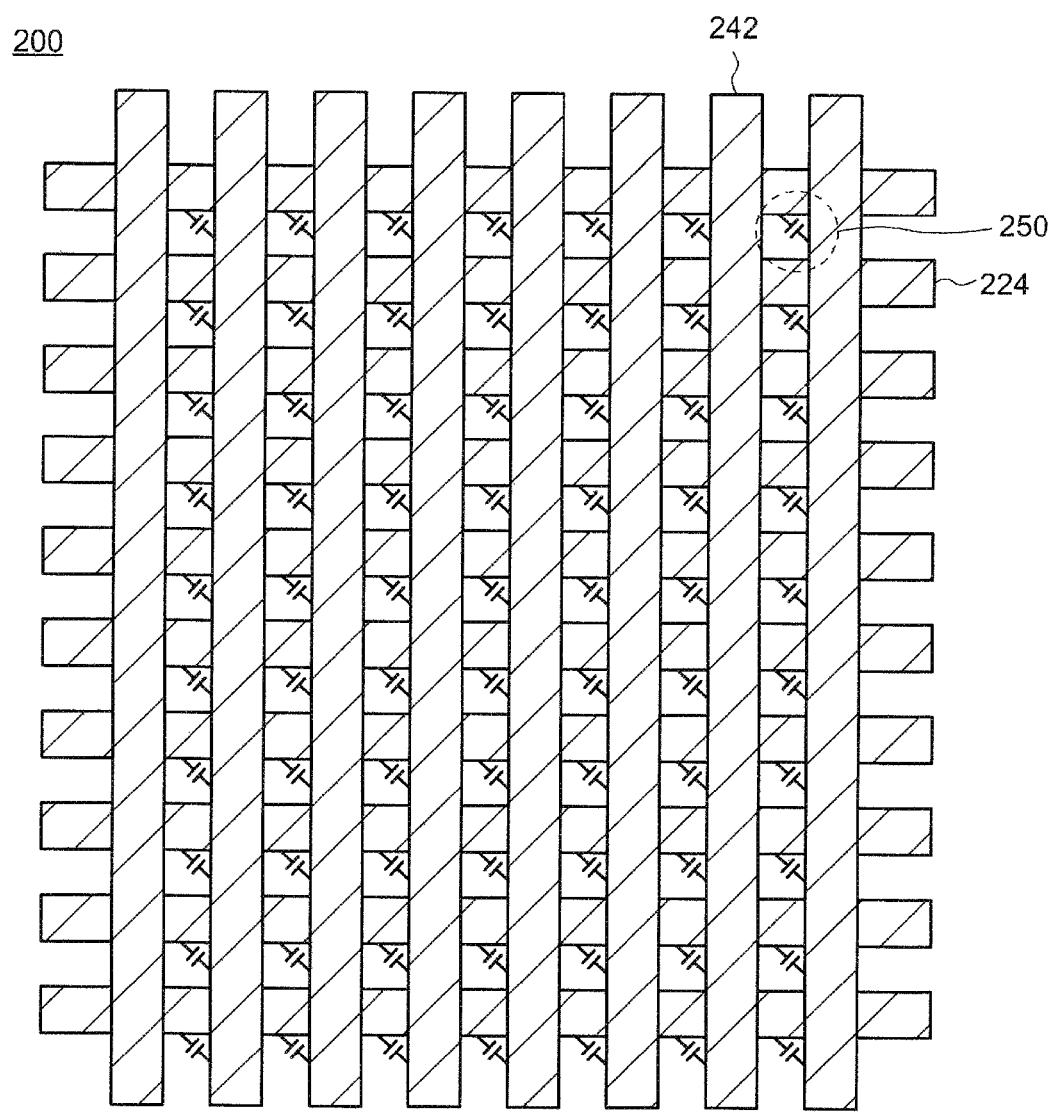
FIG. 4 is a drawing for explaining an operation mechanism of a touch sensor according to an embodiment of the present invention.

A drawing illustrating only the first wirings 244 and the second wirings 242 is shown in FIG. 4. As described above, the first wirings 224 and the second wirings 242 perpendicularly intersect with each other with the second layer 230 sandwiched therebetween. Hence, the second layer 230 functions as a dielectric, and a capacitance 250 is generated between the first wirings 224 and the second wirings 242. When an alternating voltage (pulse voltage) is applied to one of the plurality of first wirings 224 and the plurality of second wirings 242 in a time-division manner, a potential of the other one is changed due to coupling of the capacitance 250. A magnitude of this change is sensed to detect the absence or presence of a touch at certain coordinates. For example, when an alternative voltage is applied to the plurality of first wirings 224 and a user directly or indirectly contacts the touch sensor 200 (hereinafter, this operation is referred to as a touch), capacitance is newly added between the first wirings 224 and the user. As a result, the coupling between the first wirings 224 and the second wirings 242 is partly impeded, resulting in a decrease in amplitude of the voltage of the second wirings 242. Detection of this decrease in amplitude enables recognition of a touch of a user, by which a position of the touch can be specified. Therefore, the touch sensor 200 functions as a capacitive-type (projective-capacitive type) touch sensor.

Figure 5A:
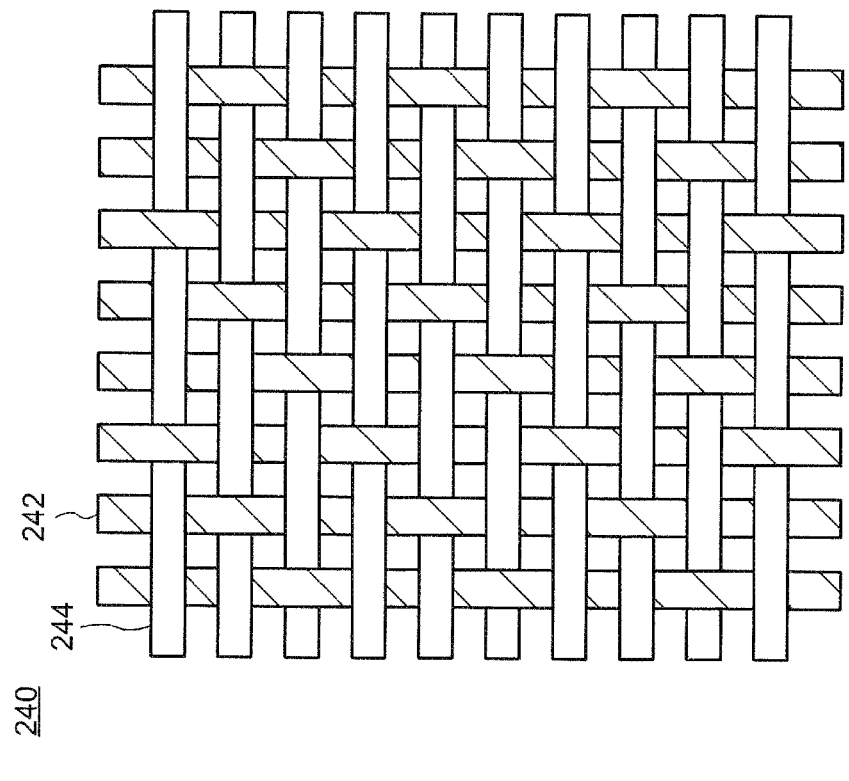
FIG. 5A and FIG. 5B are schematic developed views of a touch sensor according to an embodiment of the present invention.

The weaving mode of the plurality of first insulators 222 and the plurality of first wirings 224 is not limited to a plain weave. For example, as shown in FIG. 5A, plurality of first insulators 222 and the plurality of first wirings 224 may be twilled. In this case, the first insulators 222 each pass over one first wiring 224, successively pass under two adjacent first wirings 242, and then repeat this sequence. On the other hand, the first wirings 224 each pass under one first insulator 222, successively pass over two adjacent first insulators 222, and then repeat this sequence.

Figure 5B:
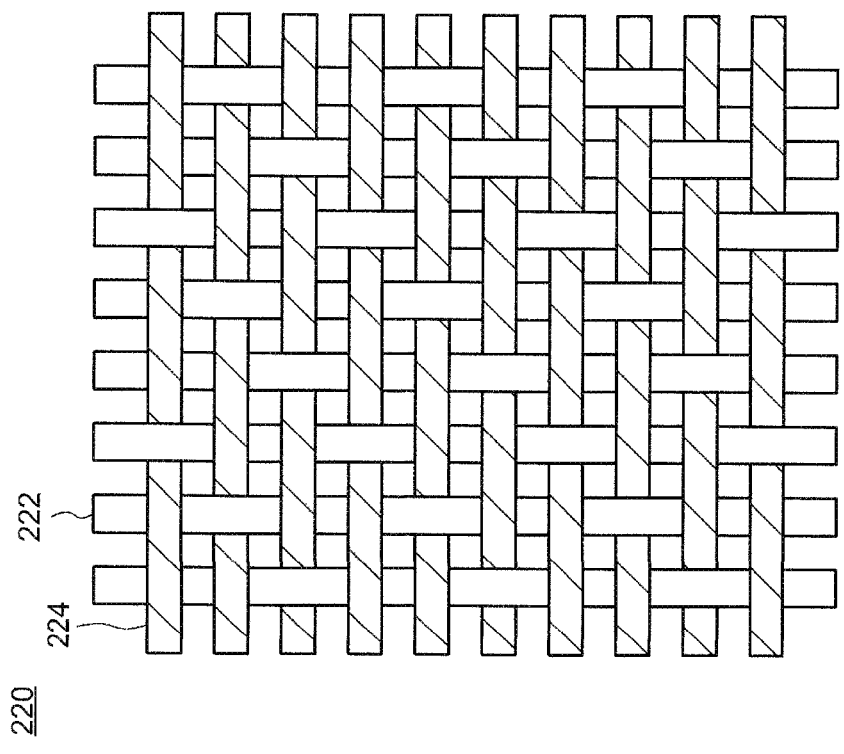

Similarly, the weaving mode of the second wirings 242 and the second insulators 244 may be twilled as shown in FIG. 5B, for example. In this case, the second insulators 244 each pass under one second wiring 242, successively pass over two adjacent second wirings 242, and then repeat this sequence. On the contrary, the second wirings 242 pass over one second insulator 244, successively pass under two adjacent second insulators 244, and then repeat this sequence. The application of the twilled structure suppresses generation of a wrinkle in the first layer 220 and the third layer 240, facilitating formation of the touch sensor 200.

Figure 6A:
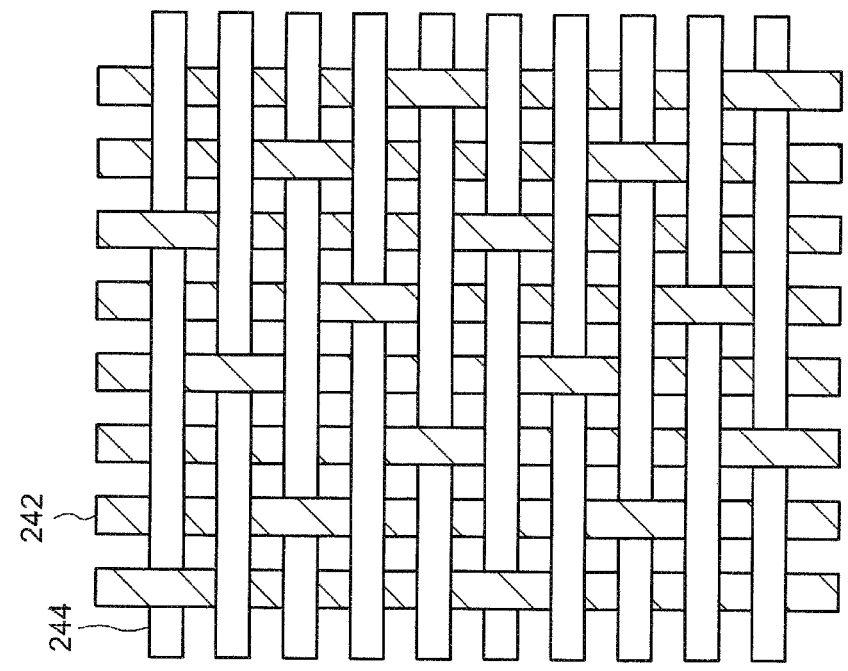
FIG. 6A and FIG. 6B are schematic developed views of a touch sensor according to an embodiment of the present invention.
Figure 6B:
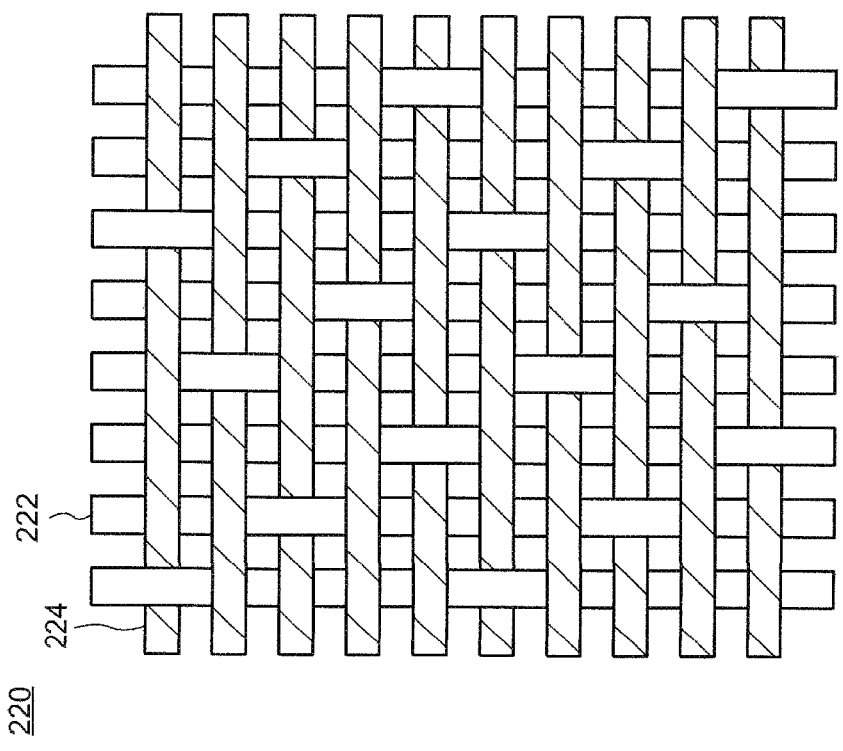

Furthermore, as shown in FIG. 6A, the plurality of first insulators 222 and the plurality of first wirings 224 may be satin-woven. Similarly, the plurality of second insulators 244 and the plurality of second wirings 242 may be satin-woven (see, FIG. 6B). In this case, in the first layer 220, the first insulators 222 each pass over one first wiring 224, successively pass under four first wirings 224, and then repeat this sequence. On the contrary, the first wirings 224 each pass under one first insulator 222, successively pass over four first insulators 222, and then repeat this sequence. In the third layer 240, the second insulators 244 each pass under one second wiring 242, successively pass over four second wirings 242, and then repeat this sequence. On the other hand, the second wirings 242 each pass over one second insulator 242, successively pass under four second insulators 244, and then repeat this sequence. The use of the satin-woven structure enables a reduction of projections and depressions at a surface of the touch sensor 200.

The first layer 220 and the third layer 240 may have different weaving modes from each other. For example, the first insulators 222 and the first wirings 224 may be plain-woven in the first layer 220, and the second insulators 244 and the second wirings 242 may be twilled or satin-woven in the second layer 230.

Figure 7:
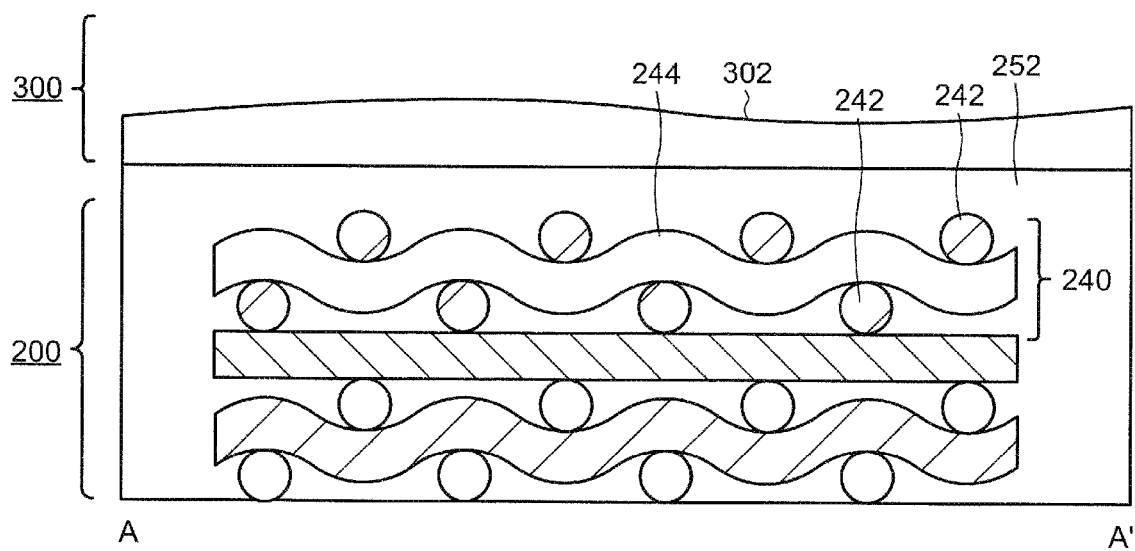
FIG. 7 is a schematic cross-sectional view of a display device according to an embodiment of the present invention.

The touch sensor 200 and the display panel 300 are adhered to each other with an adhesion layer 252 to give the display device 100. For instance, as shown in FIG. 7, the adhesion layer 252 is provided so as to cover the touch sensor 200, and the array substrate 302 of the display panel 300 is disposed thereover. At this time, the third layer 240 may be in contact with the array substrate 302 although not illustrated. Namely, the second insulators 244 and the second wirings 242 may be in contact with the array substrate 302. Alternatively, a substrate may be additionally disposed between the touch sensor 200 and the display panel 300.

3. Display Panel

As schematically illustrated in FIG. 1, the display panel 300 has a display region 306 having a plurality of pixels 308 arranged in a row direction and a column direction. Wirings (not shown) extend from the display region 306 to an edge portion of the array substrate 302 and are exposed at the edge portion of the array substrate 302 to form terminals 314. The terminals 314 are connected to a connector such as a flexible printed circuit (FPC). Image signals supplied from an external circuit are transmitted to the pixels 308 through the terminals 314, and the display elements in the pixels 308 are controlled in association with signals from the driver circuits 310 and 312, thereby reproducing an image on the display region 306.

Display elements such as light-emitting elements or liquid crystal elements giving different colors can be disposed in the plurality of pixels 308, by which full-color display is conducted. For example, display elements giving red, green, and blue colors may be arranged in the respective pixels 308. Alternatively, display elements giving white color may be used in all pixels 308, and red, green, and blue colors may be extracted from the respective pixels 308 by using a color filter. An arrangement of the pixels 308 is also not limited, and a stripe arrangement, a delta arrangement, a Pentile arrangement, and the like may be employed.

Figure 8:
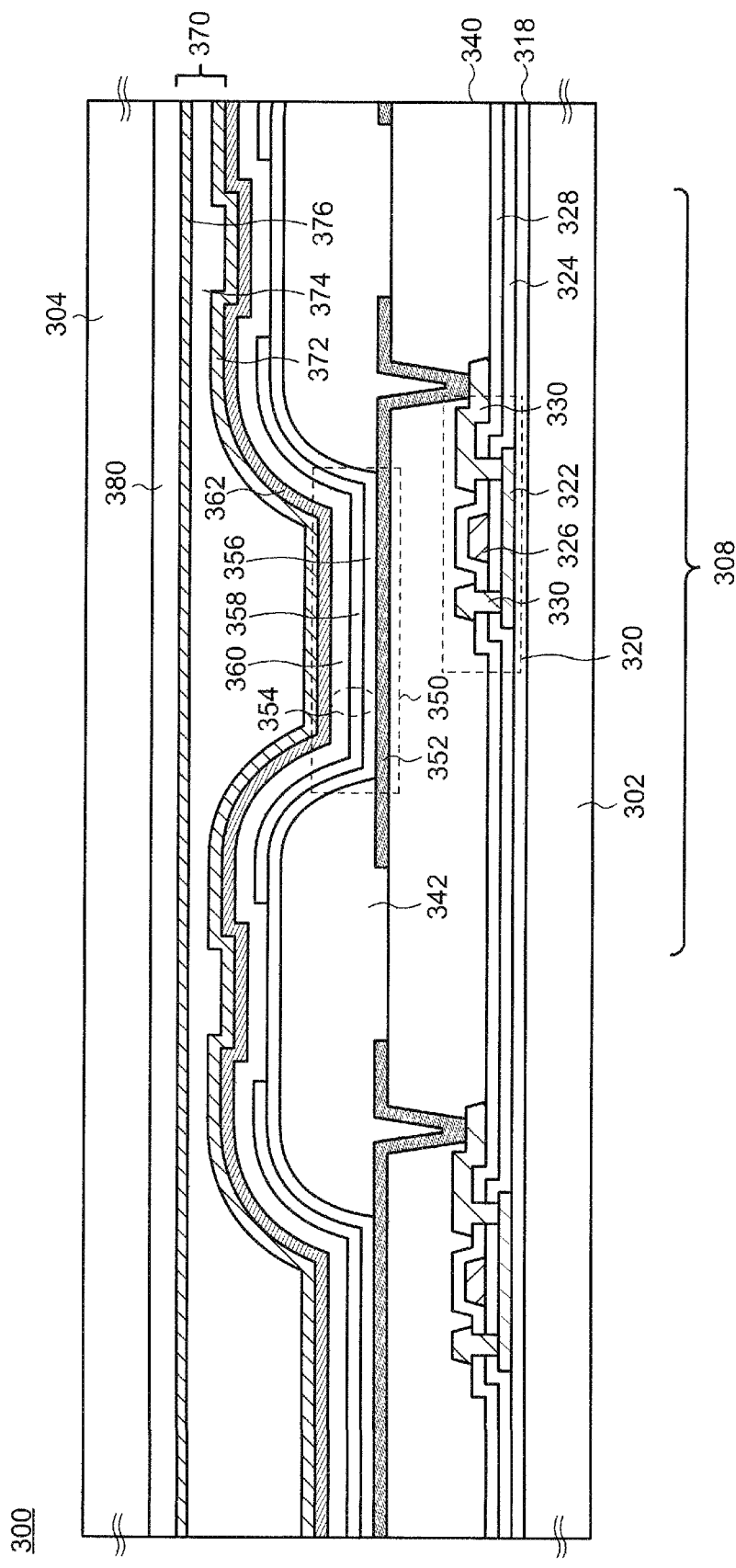
FIG. 8 is a schematic cross-sectional view of a display panel of a display device according to an embodiment of the present invention.

A schematic cross-sectional view of the display region 306 is shown in FIG. 8. FIG. 8 is a schematic view of a cross section of the plurality of pixels 308 having light-emitting elements. A transistor 320 and a light-emitting element 350 connected to the transistor 320 are provided in each pixel 308. FIG. 8 shows an example in which one transistor 320 is arranged in one pixel 308. However, a plurality of transistors may be provided in one pixel 308, and other semiconductor elements such as a capacitor element may be arranged.

The transistor 320 may possess, over an undercoat 318 provided over the array substrate 302 and consisting of one layer or a plurality of layers, a semiconductor film 322, a gate insulating film 324, a gate electrode 326, source/drain electrodes 330, and the like. An interlayer film 328 may be further formed over the gate electrode 326. There is no limitation to the structure of the transistor 320, and a top-gate type transistor or a bottom-gate type transistor may be used. A vertical relationship between the semiconductor film 322 and the source/drain electrodes 330 may be freely selected, and a bottom-contact type or a top-contact type may be employed.

A leveling film 340 absorbing projections, depressions, and inclines caused by the transistor 320 and other semiconductor elements and giving a flat surface is provided over the transistor 320. A first electrode 352 of the light-emitting element 350 is electrically connected to one of the source/drain electrodes 330 through an opening portion formed in the leveling film 340.

The display panel 300 further has a partition wall 342 covering an edge portion of the first electrode 352 and filling the opening portion used for the connection between the first electrode 352 and one of the source/drain electrodes 330. An EL layer 354 is disposed over the first electrode 352 and the partition wall 342 over which a second electrode 362 is formed. In the present specification and claims, an EL layer means layers sandwiched between the first electrode 352 and the second electrode 362. In FIG. 8, the EL layer 354 is illustrated so as to have three layers (first layer 356, second layer 358, and third layer 360). However, the number of the layers in the EL layer 354 is not limited as described below. The light-emitting element 350 is formed by the first electrode 352, the EL layer 354, and the second electrode 362.

A passivation film 370 for protecting the light-emitting element 350 is arranged over the light-emitting element 350. The passivation film 370 has a function to prevent impurities such as water and oxygen from entering the light-emitting element 350 from outside. As shown in FIG. 8, the passivation film 370 may have a plurality of stacked layers. Here, the passivation film 370 has a first layer 372, a second layer 374, and a third layer 376. As described below, the first layer 372 and the second layer 376 may contain an inorganic compound, whereas the second layer 374 may include an organic compound. The opposing substrate 304 is disposed over the passivation film 370 through an adhesion layer 380.

As shown in FIG. 1, the touch sensor 200 is arranged under the display panel 300 in the display device 100 according to the present embodiment. Therefore, it is preferred that the display elements provided in the pixels 308 be configured so as to give an image on an upper side of the display panel 300 through the opposing substrate 304. When the display element is a light-emitting element, the first electrode 352 and the second electrode 362 are configured so that light emitted from the EL layer 354 is extracted through the second electrode 362.

As described above, the first layer 220 and the third layer 240 of the touch sensor 200 are formed by weaving the plurality of insulators and wirings arranged in a stripe form. The second layer 230 may be also formed with a polymer usable in the first layer 220 and the third layer 240. Hence, production of a flexible touch sensor 200 is also feasible.

Additionally, it is possible to prepare the first layer 220 and the third layer 240 without a film-formation apparatus used in a semiconductor process, such as a sputtering apparatus and a CVD apparatus. Hence, there is no great necessity to apply a complicated process such as a semiconductor process, and the touch sensor 200 can be manufactured at low cost. Since a large-scale film-formation apparatus is not required, there is no great restriction on the size of the touch sensor 200. Therefore, the touch sensor 200 can be readily installed to a large-size display panel.

Second Embodiment

Figure 9A:
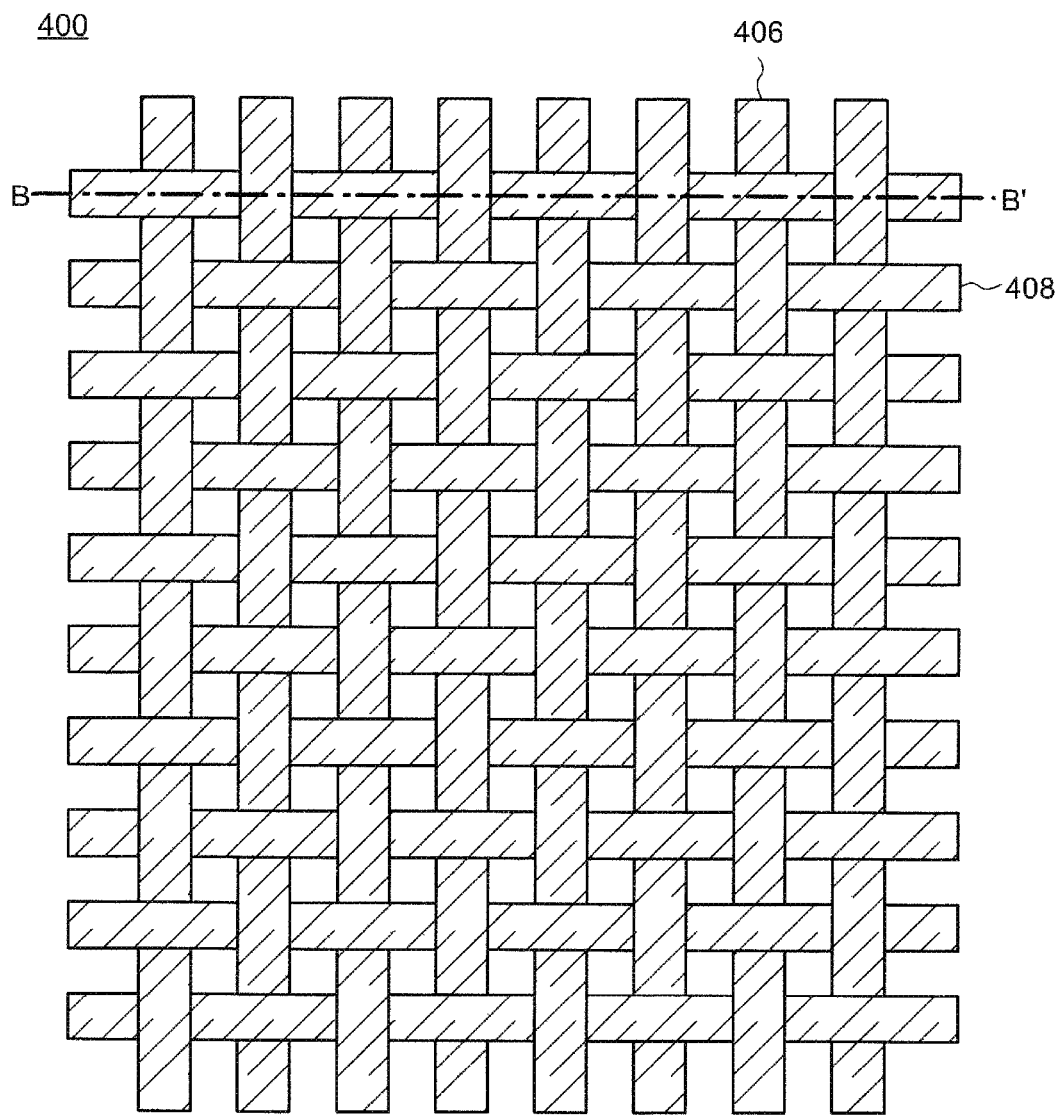
FIG. 9A and FIG. 9B are respectively a schematic top view and cross-sectional view of a touch sensor according to an embodiment of the present invention.
Figure 9B:
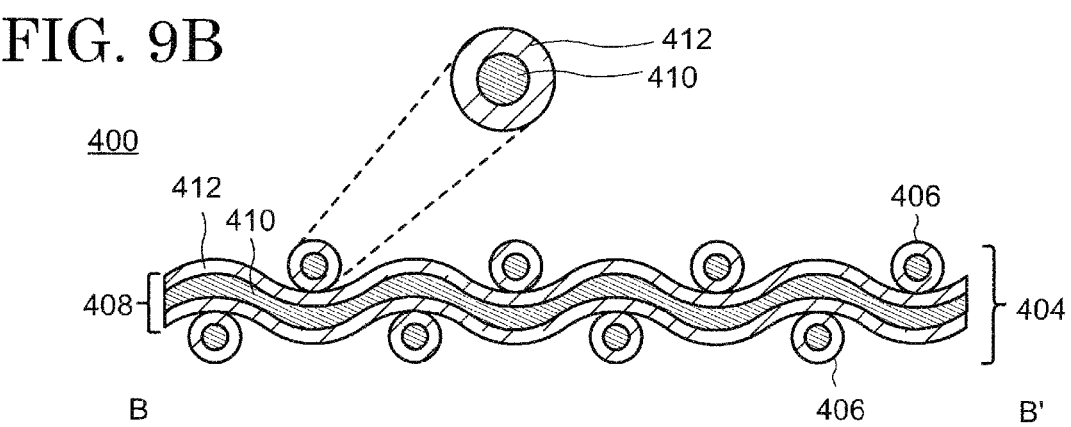

In the present embodiment, a touch sensor 400 with a structure different from that of the touch sensor 200 described in the First Embodiment is explained by using FIG. 9A and FIG. 9B. FIG. 9A is a schematic top view of the touch sensor 400, and FIG. 9B is a schematic cross-sectional view corresponding to a chain line B-B' of FIG. 9A. Explanation of the structures the same as those of the First Embodiment may be omitted.

The touch sensor 400 is different from the touch sensor 200 in that it has a single layer (first layer 404). Specifically, as shown in FIG. 9A and FIG. 9B, the touch sensor 400 possesses the first layer 404 which has a plurality of first wirings 406 arranged in a stripe form and a plurality of second wirings 408 arranged in a stripe form. The first wirings 406 and the second wirings 408 may be in contact with each other. The plurality of first wirings 406 extends in a direction (first direction), whereas the plurality of second wirings 408 extends in a direction (second direction) perpendicular to the first direction. Thus, the plurality of first wirings 406 intersects with the plurality of second wirings 408. The plurality of first wirings 406 and the plurality of second wirings 408 are woven with each other. In FIG. 9A, the first wirings 406 and the second wirings 408 are plain-woven. However, similar to the touch sensor 200, these wirings may be twilled or satin-woven.

Although not shown, similar to the First Embodiment, the display panel 300 may be arranged over the first layer 404. In this case, the first wirings 406 and the second wirings 408 may be in contact with the array substrate 302.

At least one of the plurality of first wirings 406 and the plurality of second wirings 408 has a bilayer structure. Specifically, as shown in FIG. 9B, at least one of these wirings has a core 410 and a clad 412 covering the core 410. The core 410 contains a conductive material represented by the materials usable for the first wirings 224 and the second wirings 242 of the First Embodiment.

On the other hand, the clad 412 surrounds the core 410 and includes an insulating material. As an insulating material, the materials which can be used for the first insulators 222 and the second insulators 244 of the First Embodiment are given.

A cross section of the core 410 is not limited in shape and may have a variety of shapes such as a circular shape, an elliptical shape, a square shape, a rectangular shape, or a trapezoidal shape. The clad 412 may be configured so that its cross-sectional shape is the same as, similar to, or different from that of the core 410. Note that a cross section of the wirings may also have a variety of shapes. A horizontally long shape or rectangular shape of the cross section of the wirings prevents a lateral slide, by which detection accuracy of a touch can be stabilized. Additionally, the horizontally long shape enables a thickness of the touch sensor to be reduced, maintaining sufficient sensitivity.

The clad 412 prevents a short circuit between the first wirings 406, between the second wirings 408, and between the first wiring 406 and the second wiring 408 and functions as a dielectric of capacitance formed at cross points of the first wirings 406 and the second wirings 408. Similar to the touch sensor 200, capacitance is generated at the cross points of the plurality of the first wirings 406 and the plurality of second wirings 408. Hence, according to the same principle as that of the operation of the touch sensor 200, the touch sensor 400 is capable of specifying a touch position of a user.

In FIG. 9A and FIG. 9B, an example is demonstrated where the first wirings 406 and the second wirings 408 both have the aforementioned bilayer structure. However, one of these wirings may not have the bilayer structure but may have a structure in which the core 410 is exposed. For example, one of these wirings may have the structure which is the same as that of the first wiring 224 or the second wiring 242 of the touch sensor 200.

The present embodiment is able to not only provide the effects described in the First Embodiment but also supply a touch sensor with a simpler structure. Hence, it is possible to produce a touch sensor at lower cost. Moreover, a touch sensor thinner than the touch sensor 200 can be provided. Accordingly, it is possible to further promote reduction in weight and thickness of a display device. Moreover, a display device having higher flexibility can be produced.

Third Embodiment

Figure 11:
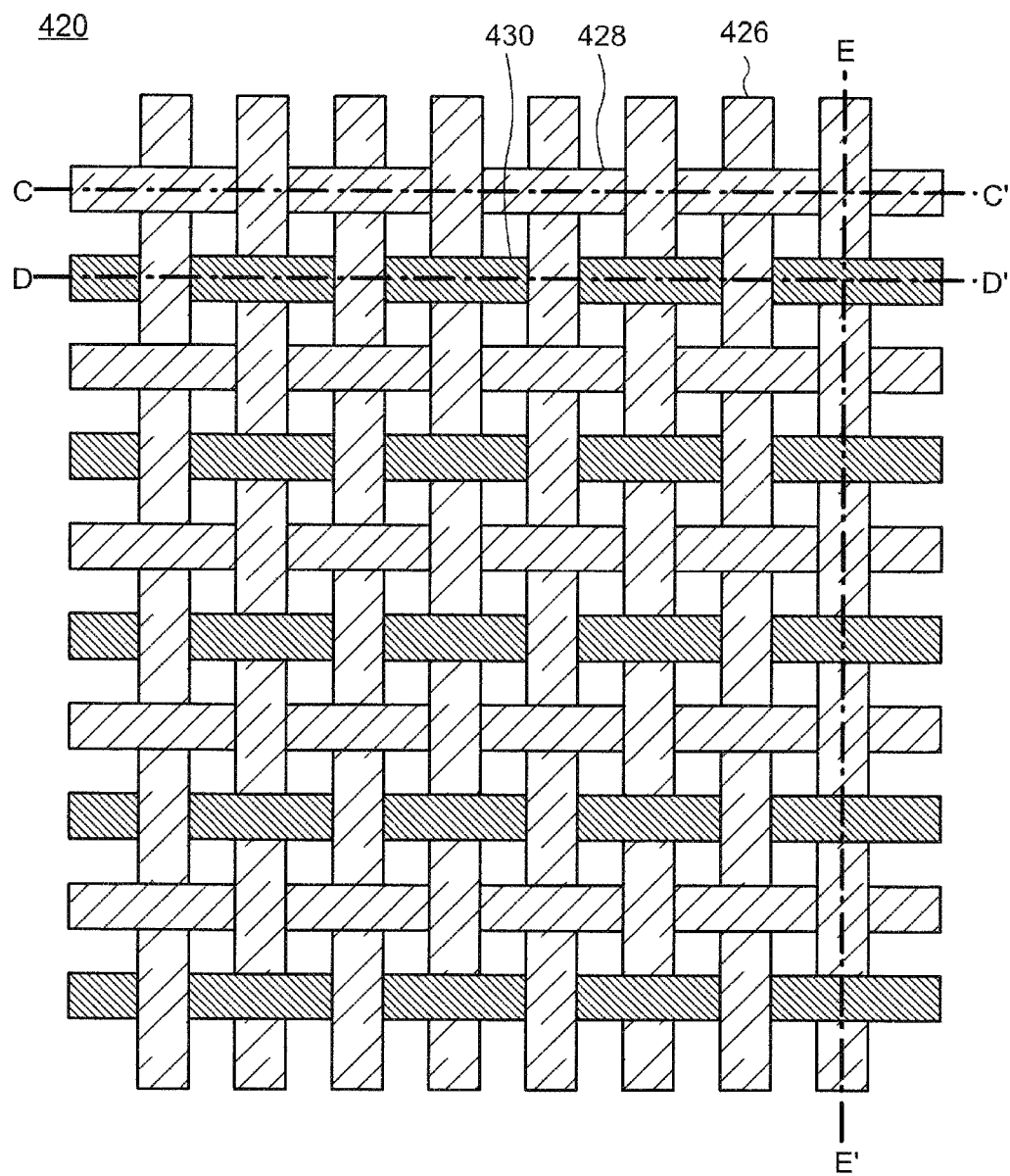
FIG. 11 is a schematic top view of a touch sensor according to an embodiment of the present invention.

In the present embodiment, a touch sensor 420 with a structure different from those of the touch sensors 200 and 400 described in the First and Second Embodiments is explained by using FIG. 11 to FIG. 14. FIG. 11 is a top view of the touch sensor 420, and the cross sections along chain lines C-C', D-D', and E-E' correspond to FIG. 12A, FIG. 12B, and FIG. 12C, respectively. Explanation of the structures the same as those of the First and Second Embodiments may be omitted.

As shown in FIG. 11, FIG. 12A, FIG. 12B, and FIG. 12C, the touch sensor 420 possesses a single layer (first layer 424) similar to the touch sensor 400. The first layer 424 has a plurality of first wirings 426 arranged in a stripe form, a plurality of second wirings 428 arranged in a stripe form, and a plurality of third wirings 430 arranged in a stripe form. The first wirings 426 and the second wirings 428 may be in contact with each other, and the first wirings 426 and the third wirings 430 may be also in contact with each other. The plurality of first wirings 426 extends in a direction (first direction). On the other hand, the plurality of second wirings 428 and the plurality of third wirings 430 extend in a direction (second direction) perpendicular to the first direction. Hence, the plurality of first wirings 426 intersects with the plurality of second wirings 428 and the plurality of third wirings 430. Note that the first direction and the second direction may not be perpendicular to each other as long as they intersect with each other.

Here, as shown in FIG. 11, the plurality of second wirings 428 and the plurality of third wirings 430 are arranged parallel so as to alternate with each other, and one second wiring 428 other than those arranged at terminal positions is adjacent to and sandwiched by two third wirings 430. Similarly, one third wiring 430 other than those arranged at terminal positions is adjacent to and sandwiched by two second wirings 428. The plurality of first wirings 426 is woven with the plurality of second wirings 428 and the plurality of third wirings 430. In FIG. 11, the first wirings 426 are plain-woven with the second wirings 428 and the third wirings 430. However, similar to the touch sensor 200, these wirings may be twilled or satin-woven.

Note that the number of the plurality of second wirings 428 and the number of the plurality of third wirings 430 may not be the same as each other. Additionally, the plurality of second wirings 428 and the plurality of third wirings 430 may not be provided so as to alternate with each other, and a multiple number of the plurality of third wirings 430 may be disposed between two adjacent second wirings 428, for example. Alternatively, a multiple number of the plurality of second wirings 428 may be disposed between two adjacent third wirings 430.

Although not shown, similar to the Second Embodiment, the display panel 300 may be arranged over the first layer 424. In this case, the first wirings 426, the second wirings 428, and the third wirings 430 may be in contact with the array substrate 302.

Figure 12A:
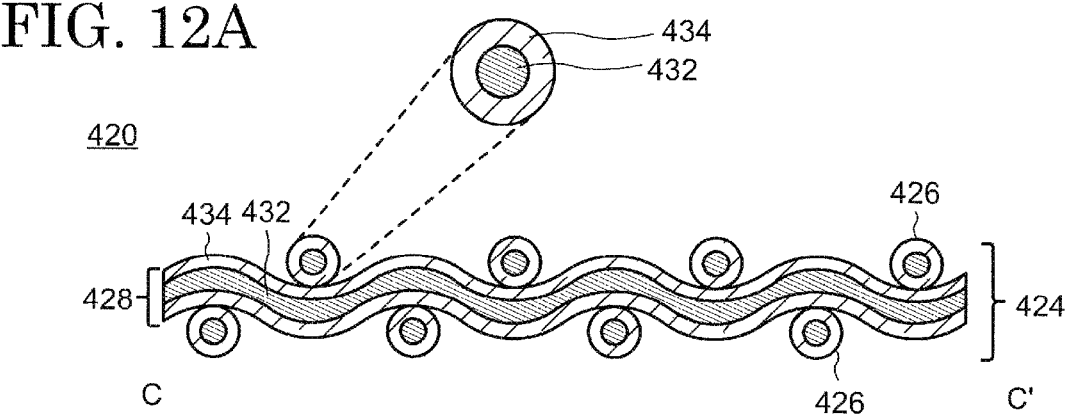
FIG. 12A to FIG. 12C are schematic cross-sectional views of a touch sensor according to an embodiment of the present invention.

Similar to the first wirings 406 and the second wirings 408 of the touch sensor 420, each of the plurality of first wirings 426 and each of the plurality of second wirings 428 have a bilayer structure. For example, as shown in FIG. 12A and its enlarged figure, the first wirings 406 and the second wirings 408 each have a first core 432 and a first clad 434 covering the first core 432. The first core 432 may include a conductive material represented by the materials usable for the first wirings 224 and the second wirings 242 of the First Embodiment.

On the other hand, the first clad 434 surrounds the first core 432 and includes an insulating material. As an insulating material, the materials usable for the first insulators 222 and the second insulators 244 of the First Embodiment are represented.

Figure 10:
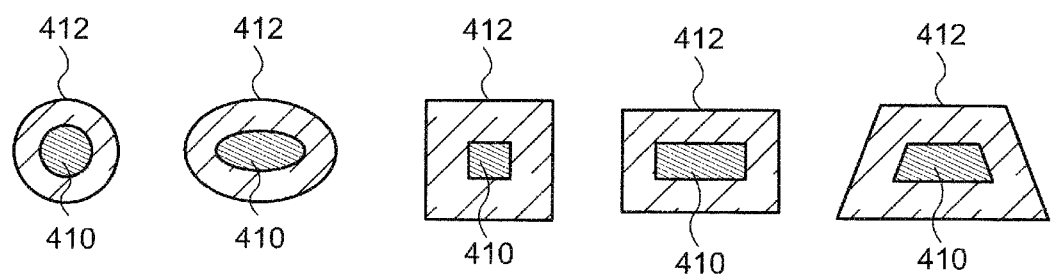
FIG. 10 is a schematic cross-sectional view of a wiring of a touch sensor according to an embodiment of the present invention.

A shape of the cross section of the first core 432 is not limited, and the cross section may have a variety of shapes similar to the first wirings 406 and the second wirings 408 of the touch sensor 420. For example, as shown in FIG. 10, the first core 432 may have a variety of cross-sectional shapes such as a circular shape, an elliptical shape, a square shape, a rectangular shape, and a trapezoidal shape. The first clad 434 may be also configured so that its cross-sectional shape is the same as, similar to, or different from that of the first core 432.

Figure 12B:
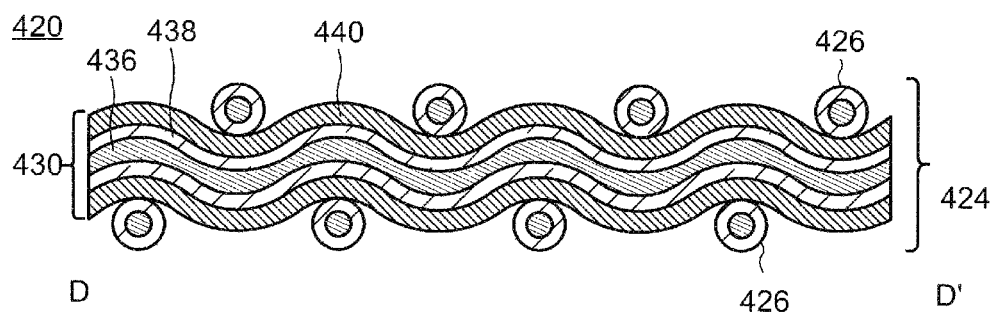
Figure 12C:
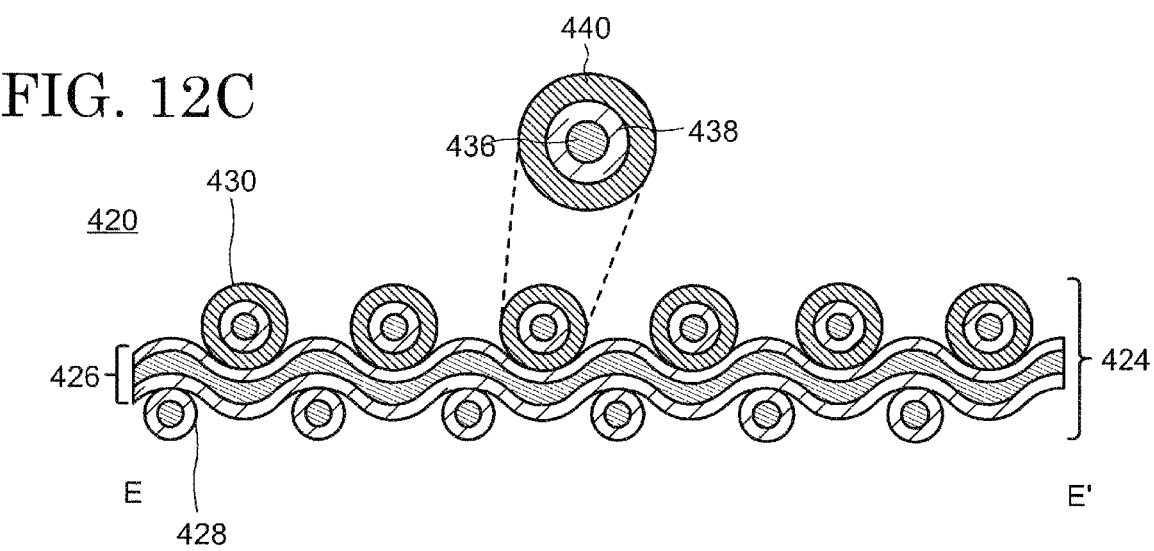

The third wirings 430 have a three-layer structure. Specifically, as shown in FIG. 12B and FIG. 12C, the third wirings 430 each have a second core 436, a second clad 438 covering the second core 436, and a third clad 440 covering the second clad 438. The second core 436 may include a conductive material, and the materials usable in the first wirings 224 and the second wirings 242 of the First Embodiment are represented as a conductive material.

The second clad 438 surrounds the second core 436 and includes an insulating material. The materials usable in the first insulators 222 and the second insulators 244 of the First Embodiment are represented as an insulating material. An elastomer may be also used as an insulating material and may have a property of being deformed when a pressure such as a touch is applied and immediately returning to the original shape when the pressure is removed.

Here, the second clad 438 is configured to keep a distance between the third clad 440 and the second core 436 in a normal direction (a pressing direction) of the touch sensor 420 constant when a touch is not performed. With this configuration, two functions as a capacitive-type touch sensor and a pressure-sensitive touch sensor can be simultaneously realized (details of operation principle are described below). This is because maintenance of a constant distance between the third clad 440 and the second core 436 in the absence of a touch allows the capacitance formed therebetween to be constant in the touch sensor 420 and to be utilized as a standard when a touch is not applied. Accordingly, a touch can be correctly sensed.

Therefore, in the touch region 242, for example, a thickness of the second clad 438 may be adjusted to be entirely constant in the third wirings 430. Note that, in the touch region 242, a thickness of the first clad 434 may be also adjusted to be entirely constant in the first wirings 426. Alternatively, the thickness of the first clad 434 of the first wirings 426 and the thickness of the second clad 438 of the third wirings 430 may be adjusted to be constant at the cross points of the first wiring 426 and the third wiring 430. Alternatively, the thickness of the first clad 434 of the first wirings 426 may be adjusted to be the same at least at the positions where the first wirings 426 and the second wirings 428 are in contact with each other, and the thickness of the first clad 438 of the second wirings 428 may be adjusted to be the same at least at the position where the second wirings 428 and the first wirings 426 are in contact with each other.

The third clad 440 surrounds the second clad 438 and may include a conductive material. The materials usable in the first wirings 224 and the second wirings 242 of the First Embodiment are represented as a conductive material.

Figure 13:
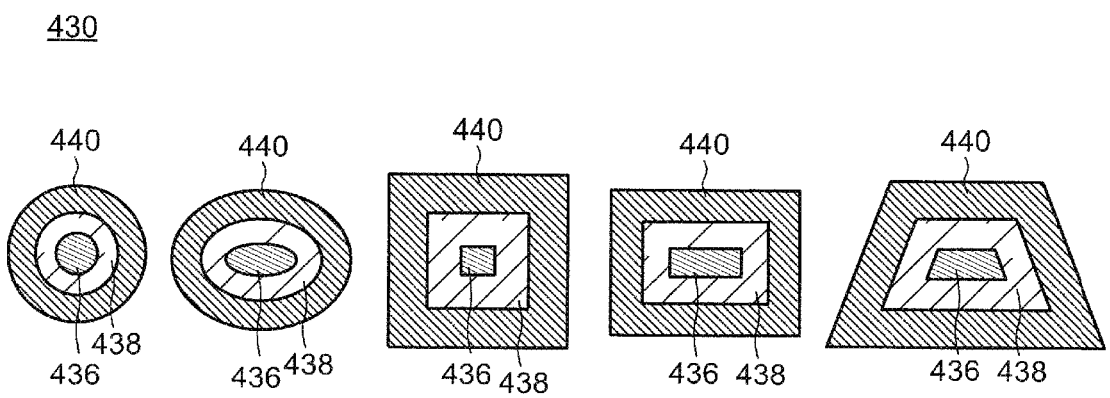
FIG. 13 is a schematic cross-sectional view of a wiring of a touch sensor according to an embodiment of the present invention.

A cross section of the second core 436 is not limited in shape, and the second core 436 may have a variety of cross-sectional shapes such as a circular shape, an elliptical shape, a square shape, a rectangular shape, and a trapezoidal shape as shown in FIG. 13, for example. The second clad 438 may be configured so that a cross-sectional shape thereof is the same as, similar to, or different from that of the second core 436. Similarly, the third clad 440 may be configured so that a cross-sectional shape thereof is the same as, similar to, or different from those of the second core 436 and the second clad 438.

Figure 14:
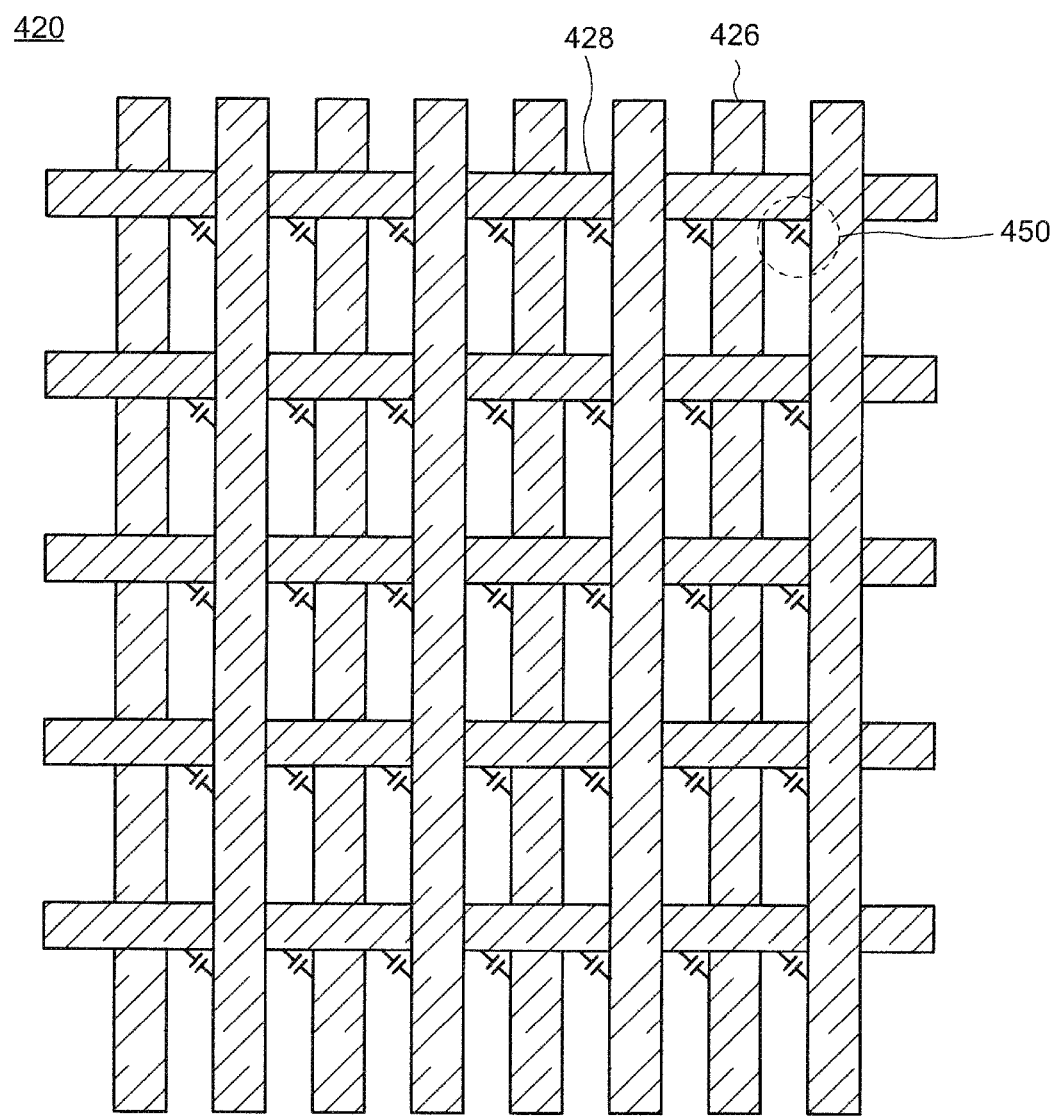
FIG. 14 is a drawing for explaining an operation mechanism of a touch sensor according to an embodiment of the present invention.
Figure 15A:
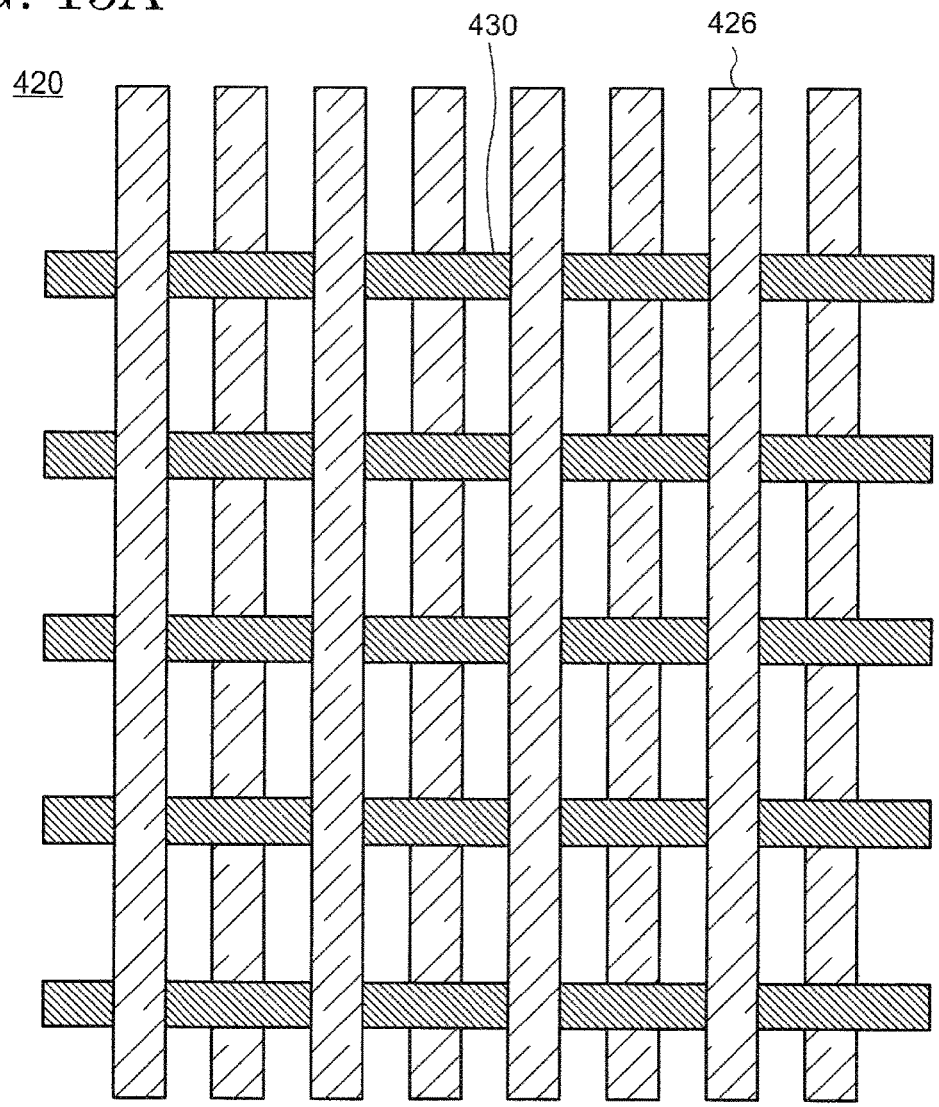
FIG. 15A and FIG. 15B are drawings for explaining an operation mechanism of a touch sensor according to an embodiment of the present invention.
Figure 15B:
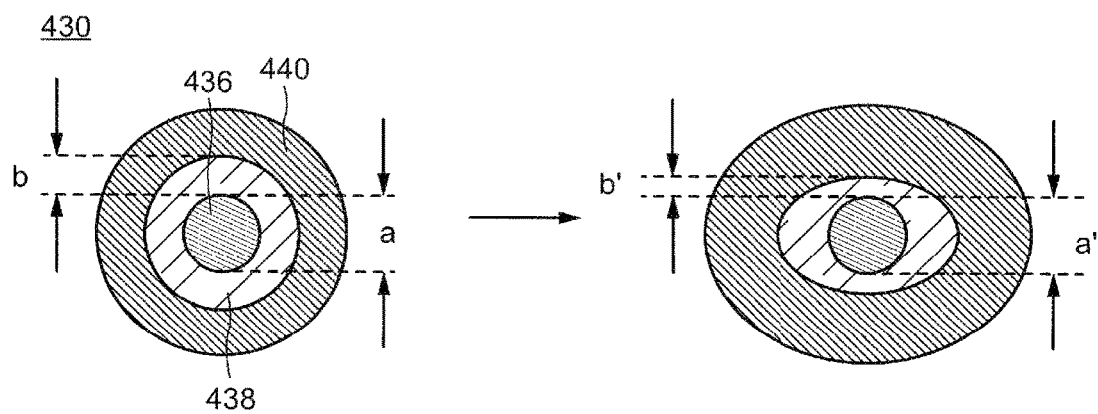

The function and operation of the touch sensor 420 are outlined by using FIG. 14, FIG. 15A, and FIG. 15B. FIG. 14 is a drawing obtained by removing the third wirings 430 from the first wirings 426, the second wirings 428, and the third wirings 430 which construct the touch sensor 420. As described above, the first wirings 426 and the second wirings 428 each have the first core 432 including a conductive material and a first clad 434 including an insulating material and covering the first core 432. The first clad 434 has a function to prevent a short circuit between the first wiring 426 and the second wiring 428 and a function as a dielectric of capacitance formed at the cross points of the first wirings 426 and the second wirings 428. Similar to the touch sensor 200, capacitance 450 is generated at the cross points of the plurality of first wirings and the plurality of second wirings. Hence, according to a principle the same as that of the touch sensor 200, the touch sensor 420 is capable of specifying a touch position of a user. That is, a capacitive-type (projective-capacitive type) touch sensor is formed by the first wirings 426 and the second wirings 428 of the touch sensor 420.

FIG. 15A is a drawing obtained by removing the second wirings 428 from the first wirings 426, the second wirings 428, and the third wirings 430 constructing the touch sensor 420, and FIG. 15B is a schematic cross-sectional view of the third wiring 430. As described above, the third wirings 430 each have the second core 436 including a conductive material, the second clad 438 covering the second core 436 and including an insulating material, and the third clad 440 covering the second clad 438 and including a conductive material. Capacitance C represented by equation 1 is formed in the third wiring 430 with this structure:

$$C = \frac{2\pi\varepsilon L}{\ln(b/a)} \quad (1)$$

where C is a capacitance generated in the third wiring 430, ε is a permittivity of a material included in the second clad 438, L is a length of the third wiring 430 (in the second direction), a is a radius of the cross section of the second core 436, and b is a radius of the second clad 438 when an outer circumference of the cross section of the second clad 438 is assumed to be circular (see FIG. 15B).

When a constant potential difference V is provided between the second core 436 and the third clad 440 of the third wiring 430, a charge corresponding to the capacitance C is accumulated in the third wiring 430. When a user applies a pressure by directly or indirectly contacting the touch sensor 420 in this state, the second clad 438 is deformed. This is because an elastic modulus of the material used in the second clad 438 is smaller than that in the second core 436, that is, because the material used in the second clad 438 is more flexible than that in the second core 436. For example, as shown in FIG. 15B, when a pressure of a touch is applied from above to the third wiring 430, the second clad 438 is deformed, leading to deformation of the third clad 440. As a result, a thickness b significantly changes (b>b'), while a thickness a negligibly changes (a~a'). Hence, the capacitance C of the third wiring 430 changes according to the equation 1.

Accordingly, power consumption when charging and discharging the second core 436 or the third clad 440 changes in accordance with the change of the capacitance C. Sensing this change and its magnitude makes it possible to sense a touch by a user and estimate intensity thereof. Furthermore, the third wirings 430 touched by a user can be specified. In other words, the third wirings 430 are capable of functioning as a pressure-sensitive touch sensor.

In view of the aforementioned operation principle, it can be considered that the touch sensor 420 has a structure in which two kinds of touch sensors with different modes and functions, i.e., a capacitive touch sensor and a pressure-sensitive touch sensor, are constructed in the same layer. Hence, application of the present embodiment provides not only the effects described in the First and Second Embodiments but also enables production of a touch sensor having two functions as a single layer. Accordingly, it is possible to produce a display device which is highly functionalized and reduced in weight and thickness.

Fourth Embodiment

Figure 16:
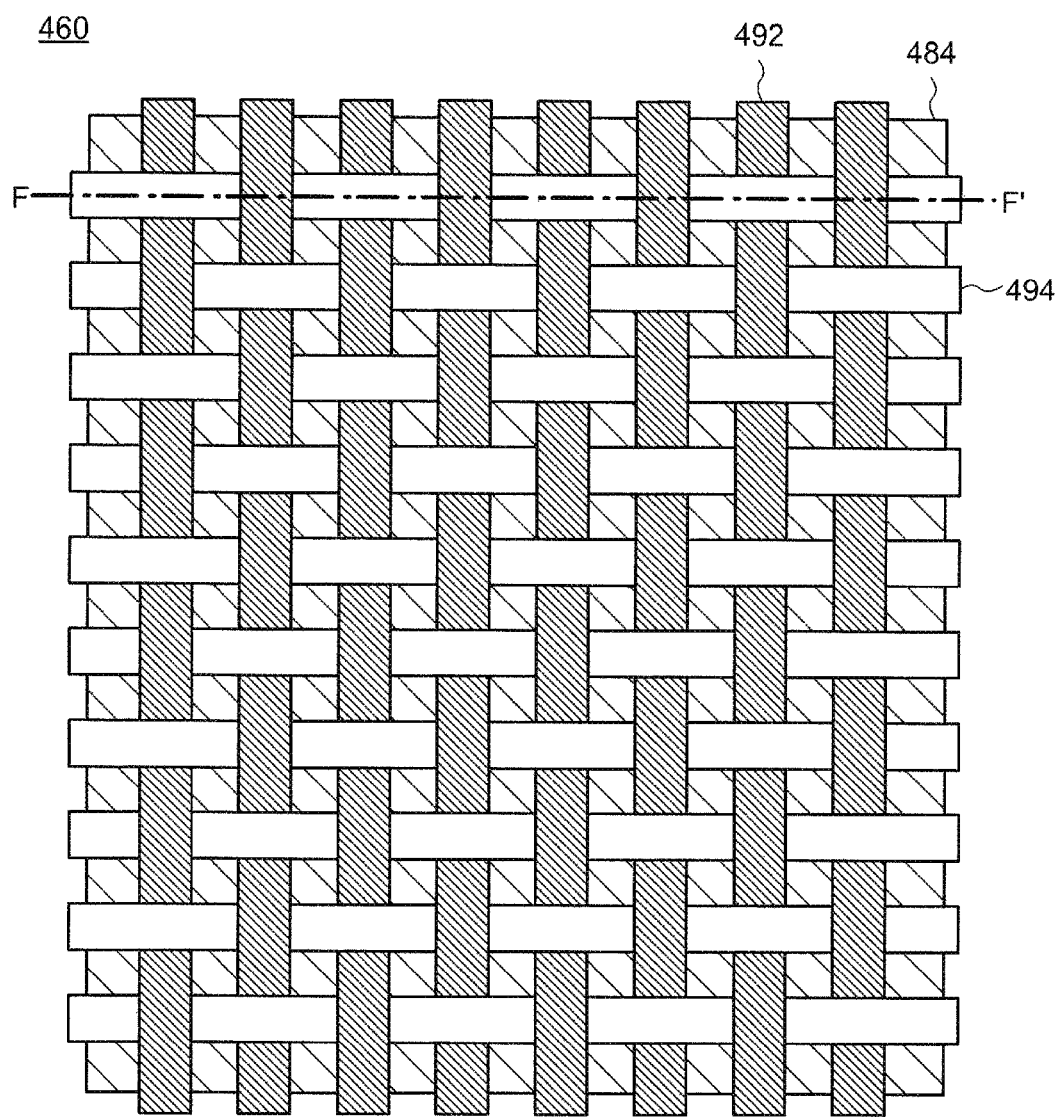
FIG. 16 is a schematic top view of a touch sensor according to an embodiment of the present invention.

In the present embodiment, a touch sensor 460 with a structure different from those of the touch sensors 200, 400, and 420 is explained by using FIG. 16 to FIG. 18B. FIG. 16 is a schematic top view of the touch sensor 460, and FIG. 18A is a schematic cross-sectional view along a chain line F-F' of FIG. 16.

Similar to the touch sensor 200, the touch sensor 460 has a first layer 470, a second layer 484 over the first layer 470, and a third layer 490 over the second layer 484. In FIG. 16, only the second layer 484 and the third layer 490 are shown for promoting understanding. The first layer 470, the second layer 484, and the third layer 490 may have substantially the same shape and size and overlap with one another.

Figure 17C:
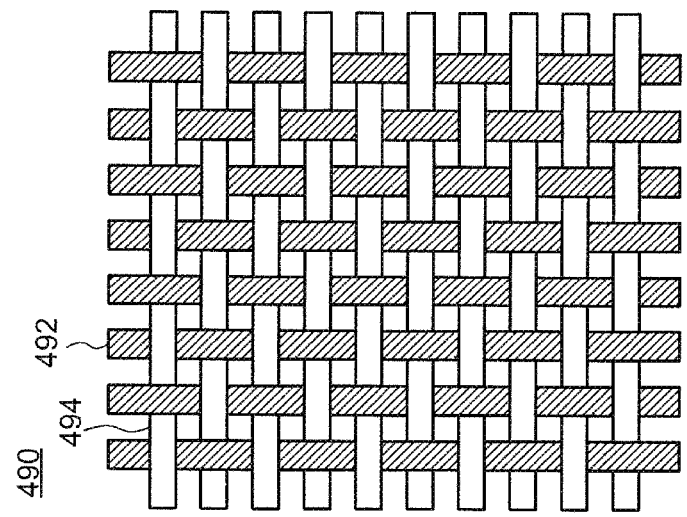
FIG. 17A to FIG. 17C are schematic developed views of a touch sensor according to an embodiment of the present invention.
Figure 17B:
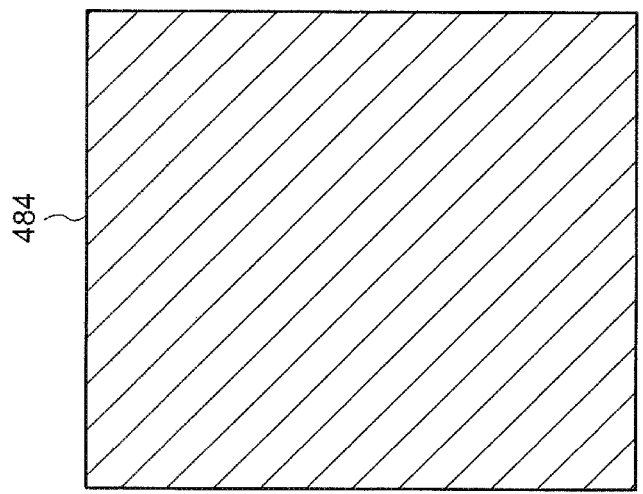
Figure 17A:
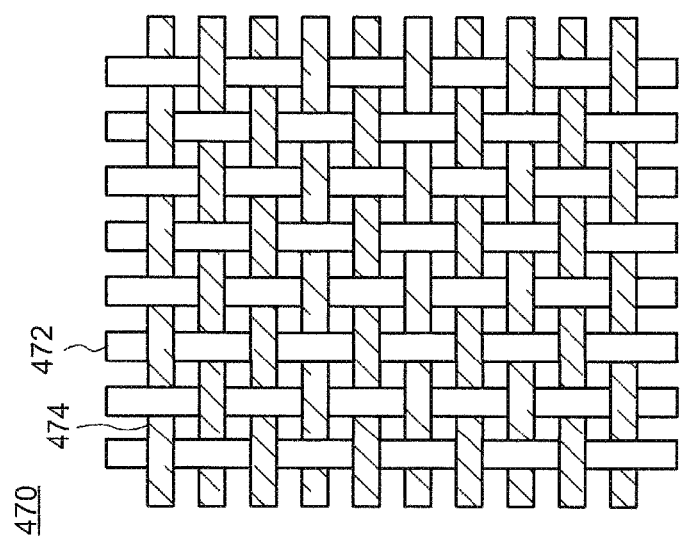

The first layer 470, the second layer 484, and the third layer 490 obtained by developing the touch sensor 460 are shown in FIG. 17A, FIG. 17B, and FIG. 17C, respectively. As shown in FIG. 17A, the first layer 470 possesses a plurality of first insulators 472 arranged in a stripe form and a plurality of first wirings 474 arranged in a stripe form. The first insulators 472 and the first wirings 474 may be in contact with each other. The first insulators 472 extend in a direction (first direction), whereas the first wirings 474 extends in a direction (second direction) perpendicular to the first direction. The first insulators 472 and the first wirings 474 are woven with each other and serve as warp and weft, respectively. As shown in FIG. 17A, the first insulators 472 and the first wirings 474 may have a structure in which they are plain-woven. However, they may be twilled or satin-woven.

The second layer 484 is provided over the first layer 470. The second layer 484 may be in contact with the first wirings 474 and the first insulators 472. The second layer 484 may have the same structure as that of the second layer 230 of the touch sensor 200 described in the First Embodiment.

The third layer 490 may have a similar structure to that of the first layer 470. Specifically, as shown in FIG. 17C, the third layer 490 has a plurality of second wirings 492 arranged in a stripe form and a plurality of second insulators 494 arranged in a stripe form. The second wirings 492 and the second insulators 494 may be in contact with each other. The second wirings 492 and the second insulators 494 may be in contact with the second layer 484. The second wirings 492 extend in the first direction, whereas the second insulators 494 extend in the second direction. Therefore, the plurality of first wirings 474 and the plurality of second wirings 492 intersect with each other with the second layer 484 sandwiched therebetween. The second wirings 492 and the second insulators 494 are woven with each other and sever as warp and weft, respectively. As shown in FIG. 17C, the second wirings 492 and the second insulators 494 may have a structure in which they are plain-woven. However, they may be twilled or satin-woven.

As shown in FIG. 18A and FIG. 18B, similar to the first wirings 406 and the second wirings 408 of the touch sensor 400, each of the first wirings 474 may have a bilayer structure. That is, the plurality of first wirings 474 each possess a first core 476 and a first clad 478 covering the first core 476. The first core 476 may include a conductive material, and the materials usable for the first wirings 224 and the second wirings 242 of the First Embodiment are represented as a conductive material.

The first clad 478 surrounds the first core 476 and includes an insulating material. The materials usable in the first insulators 222 and the second insulators 244 of the First Embodiment are exemplified as an insulating material.

Similar to the third wirings 430 of the touch sensor 420, each of the plurality of the second wirings 492 may have a three-layer structure. Specifically, as shown in FIG. 18A and FIG. 18B, the second wirings 492 each have a second core 496, a second clad 498 covering the second core 496, and a third clad 500 covering the second clad 498. The second core 496 may include a conductive material, and the materials usable for the first wirings 224 and the second wirings 242 of the First Embodiment are represented as a conductive material.

The second clad 498 surrounds the second core 496 and includes an insulating material. The materials usable for the first insulators 222 and the second insulators 244 of the First Embodiment are represented as an insulating material. As an insulating material, an elastomer which is deformed when a pressure is applied and immediately returns to the original shape when the pressure is removed is preferred.

The third clad 500 surrounds the second clad 498 and may include a conductive material. The materials usable for the first wirings 224 and the second wirings 242 of the First Embodiment are exemplified as a conductive material.

Similar to the first wirings 406 and the second wirings 408 of the touch sensor 400 and the third wirings 430 of the touch sensor 420, cross-sectional shapes of the first wirings 474 and the second wirings 492 of the touch sensor 460 are freely designed and may be the shapes illustrated in FIG. 10 and FIG. 13, respectively.

As described above, the plurality of the first wirings 474 and the plurality of second wirings 492 perpendicularly intersect with each other with the second layer 484 containing an insulating material sandwiched therebetween. Therefore, the second layer 484 functions as a dielectric, and capacitance is formed at the cross points of the plurality of first wirings 474 and the plurality of second wirings 492. According to the principle the same as that of the touch sensor 200, the touch sensor 460 is capable of specifying a touch position of a user.

In contrast, similar to the third wirings 430 of the touch sensor 420, the second wirings 492 in the third layer 490 of the touch sensor 460 have a capacitance C represented by the equation 1. Additionally, the second clad 498 is deformed due to the material used therein when a user applies a pressure by directly or indirectly touching the touch sensor 460. As a result, the capacitance between the second core 496 and the third clad 500 is changed, and power consumption when charging and discharging the second core 496 or the third clad 500 is changed. Sensing of this change and intensity thereof allows sensing a touch by a user and estimating its intensity. Moreover, the second wirings 492 touched by a user can be specified. Namely, the second wirings 492 are capable of functioning as a pressure-sensitive touch sensor. In view of the aforementioned operation principle, it can be concluded that the touch sensor 460 has a structure in which two kinds of touch sensors with different modes and functions are stacked.

Figure 19:
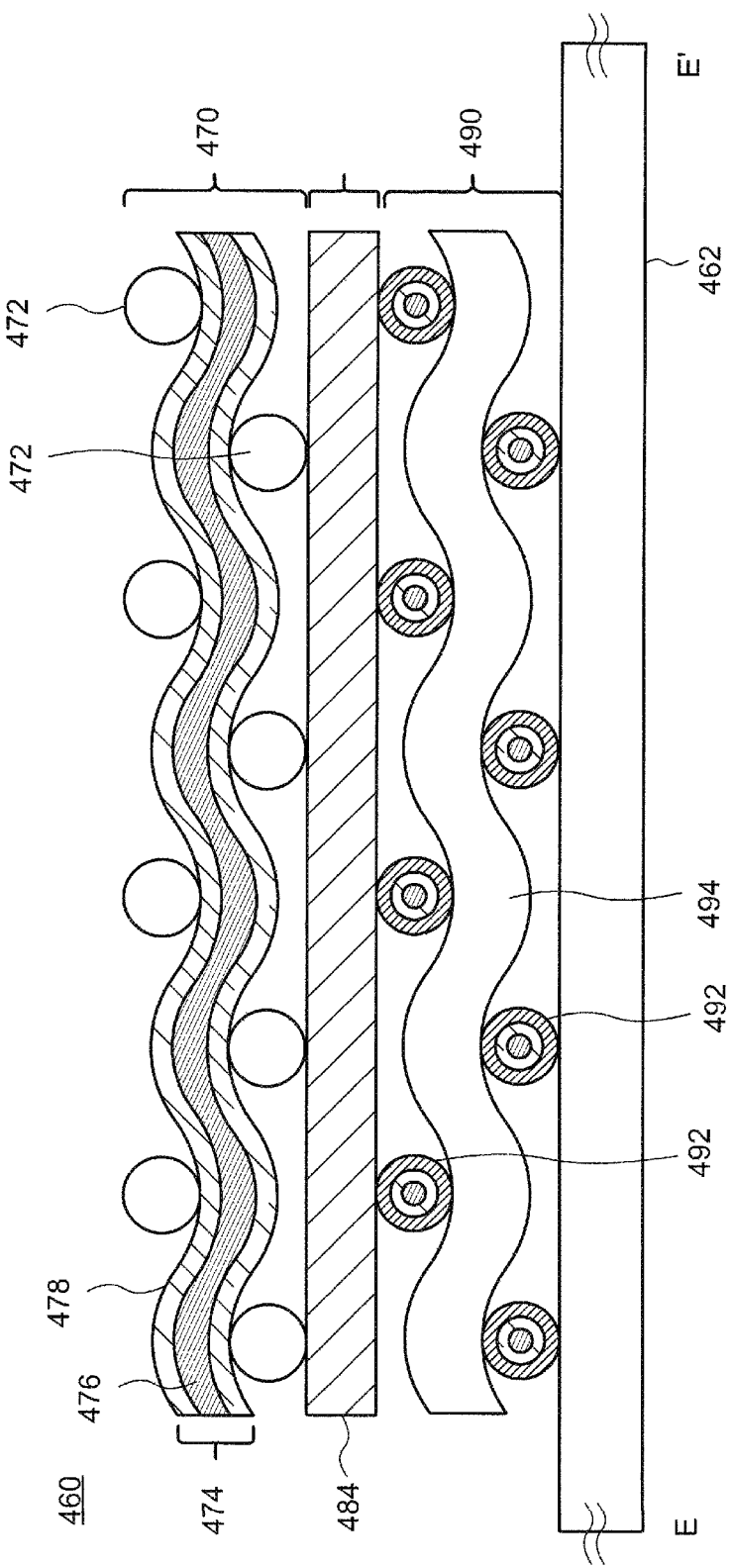
FIG. 19 is a schematic cross-sectional view of a touch sensor according to an embodiment of the present invention.

The first layer 470 and the third layer 490 of the touch sensor 460 may be interchanged with each other. That is, as shown in FIG. 19, the touch sensor 460 may include the third layer 490 in which the second wirings 492 and the second insulators 494 are woven with each other. Furthermore, the first layer 470 in which the first insulators 472 and the first wirings 474 are woven may be provided over the third layer 490 with the second layer 484 sandwiched therebetween.

Similar to the touch sensor 200 and the like, a film-formation apparatus used in a semiconductor process, such as a sputtering apparatus and a CVD apparatus, is not necessary in manufacturing the touch sensor 460. Therefore, there is a low necessity to apply a complicated process like a semiconductor process, and the touch sensor 460 can be manufactured in low cost. Moreover, since a large-scale film-formation apparatus is not required, there is no great restriction on the size of the touch sensor 460. Therefore, the touch sensor 200 can be readily installed to a large-size display panel.

Fifth Embodiment

In the present embodiment, an example of a method for manufacturing the display panel 300 described in the First Embodiment is explained by using FIG. 8 and FIG. 20A to FIG. 22B. FIG. 20A to FIG. 22B correspond to the cross-sectional view of FIG. 8. Explanation of the structures the same as those of the First Embodiment may be omitted.

First, the undercoat 318 is formed over the array substrate 302 (FIG. 20A). The array substrate 302 has a function to support the semiconductor elements included in the display panel 300, such as the transistor 320 and the light-emitting element 350. The array substrate 302 may contain glass, plastics, a metal, or the like. The array substrate 302 may have flexibility. In this case, the array substrate 302 may include a polymer such as a polyimide, a polyester, and a polycarbonate.

The undercoat 318 is a film having a function to prevent diffusion of impurities such as an alkaline metal from the array substrate 302 to the transistor 320 and the like and may include an inorganic insulator such as silicon nitride, silicon oxide, silicon nitride oxide, and silicon oxynitride. The undercoat 318 can be formed with a CVD method, a sputtering method, or the like so as to have a single layer or stacked layer structure. When an impurity concentration in the array substrate 302 is low, the undercoat may not be provided or may be provided to partly cover the array substrate 302.

Next, the semiconductor film 322 is formed over the undercoat 318 (FIG. 20A). The semiconductor film 322 may include a Group 14 element such as silicon, for example. Alternatively, the semiconductor film 322 may include an oxide semiconductor. An oxide semiconductor may contain a Group 13 element such as indium and gallium and is exemplified by a mixed oxide of indium and gallium (IGO). When an oxide semiconductor is used, the semiconductor film 322 may further contain a Group 12 element, and a mixed oxide including indium, gallium, and zinc (IGZO) is represented as an example. Crystallinity of the semiconductor film 322 is not limited and may be single-crystalline, polycrystalline, microcrystalline, or amorphous.

When the semiconductor film 322 includes silicon, the semiconductor film 322 may be formed with a CVD method by using a silane gas or the like as a raw material. Crystallization may be conducted on the obtained amorphous silicon by performing a heat treatment or irradiation of light such as a laser. When the semiconductor film 322 includes an oxide semiconductor, the semiconductor film 322 can be prepared by utilizing a sputtering method and the like.

Next, the gate insulating film 324 is formed so as to cover the semiconductor film 322 (FIG. 20A). The gate insulating film 324 may have a single-layer structure or a stacked-layer structure and can be formed with a method the same as that of the undercoat 318. Alternatively, an inorganic compound with high permittivity, such as hafnium oxide and hafnium silicate, may be used.

Next, the gate electrode 326 is formed over the gate insulating film 324 with a sputtering method or a CVD method (FIG. 20B). The gate electrode 326 can be formed with a metal such as titanium, aluminum, copper, molybdenum, tungsten, and tantalum or an alloy thereof so as to have a single-layer or stacked layer structure. For example, a structure can be employed in which a metal with a high conductivity, such as aluminum and copper, is sandwiched by a metal with a relatively high melting point, such as titanium, tungsten, and molybdenum.

Next, the interlayer film 328 is fabricated over the gate electrode 326 (FIG. 20B). The interlayer film 328 may have a single-layer structure or a stacked-layer structure and can be formed with a method the same as that of the undercoat 318.

Next, etching is performed on the interlayer film 328 and the gate insulating film 324 to form an opening portion reaching the semiconductor film 322. The opening portion may be formed by conducting plasma etching in a gas including a fluorine-containing hydrocarbon, for example. Sequentially, a metal film is formed so as to cover the opening portion and processed by etching, thereby forming the source/drain electrodes 330 (FIG. 20C). The metal film may have a similar structure to that of the gate electrode 326 and can be formed with a method similar to that of the gate electrode 326. Through these steps, the transistor 320 is fabricated.

Next, the leveling film 340 is formed to cover the source/drain electrodes 330 (FIG. 21A). As described above, the leveling film has a function to absorb projections, depressions, and inclinations caused by the transistor 320 and other semiconductor elements and to give a flat surface. The leveling film 340 can be formed with an organic compound. As an organic compound, a polymer material such as an epoxy resin, an acrylic resin, a polyimide, a polyamide, a polyester, a polycarbonate, and a polysiloxane is exemplified, and the leveling film 340 can be formed with a wet-type film-formation method. The leveling film 340 may have a stacked structure including a layer containing the aforementioned organic compound and a layer containing an inorganic compound. In this case, a silicon-containing inorganic compound such as silicon oxide, silicon nitride, silicon nitride oxide, and silicon oxynitride is represented as an inorganic compound. A film containing these inorganic compounds may be formed with a sputtering method or a CVD method.

Next, etching is carried out on the leveling film 340 to form the opening reaching one of the source/drain electrodes 330. After that, the first electrode 352 of the light-emitting element 350 is formed over the leveling film 340 by using a sputtering method and the like (FIG. 21B). In the present embodiment, a structure is shown in which the first electrode 352 is in direct contact with the source/drain electrode 330. However, another layer with conductivity may be formed between the first electrode 352 and the source/drain electrode 330.

The first electrode 352 may include a conductive oxide with a light-transmitting property or a metal. In the present embodiment, a metal such as aluminum and silver or an alloy thereof may be used for the first electrode 352 in order to extract light obtained from the light-emitting element 350 in a direction opposite to the array substrate 302. In this case, a stacked structure of the aforementioned metal or alloy and a conductive oxide having a light-transmitting property, i.e., a stacked structure in which a metal is sandwiched by a conductive oxide (conductive oxide/metal/conductive oxide), may be employed. As a conductive oxide, indium-tin oxide (ITO) or indium-zinc oxide (IZO) can be used.

Next, the partition wall 342 is fabricated to cover the edge portion of the first electrode 352 (FIG. 21B). A step caused by the first electrode 352 and the like can be covered with the partition wall 342. The partition wall 342 is also an insulating film and can be formed with a wet-type film-formation method by using a material usable for the leveling film 340, such as an epoxy resin and an acrylic resin.

Next, the light-emitting element 350 is prepared. Specifically, the EL layer 354 is formed over the first electrode 352 and the partition wall 342 (FIG. 22A). In FIG. 22A, the EL layer 354 has a three-layer structure including the first layer 356, the second layer 358, and the third layer 360. However, a structure of the EL layer 354 is not limited. The EL layer 354 may be formed with a single layer or four or more layers. For example, the EL layer 354 can be prepared by appropriately combining a carrier-injection layer, a carrier-transporting layer, an emission layer, a carrier-blocking layer, an exciton-blocking layer, and the like. The EL layer 354 can be formed with the aforementioned wet-type film-formation method, an evaporation method, or the like.

In FIG. 22A, an example is shown in which the first layer 356 and the third layer 360 are continuously formed between the adjacent pixels 308, while the second layer 358 are independently formed between the adjacent pixels 308. However, the structure of the EL layer 354 is not limited thereto. For example, the EL layer 354 with the same structure may be used in all of the pixels 308. In this case, the EL layer 354 giving white emission is formed so as to be shared by the adjacent pixels 308, and a wavelength of light extracted from each pixel 308 is selected with a color filter and the like. Alternatively, the structure of the EL layer 354 may be different between the adjacent pixels 308. For example, the EL layer 354 may be formed so that the emission layer is different but other layers have the same structure between the adjacent pixels 308.

The light-emitting element 350 is fabricated by forming the second electrode 362 over the EL layer 354 (FIG. 22A). For example, the second electrode 362 can be formed by preparing a film of a metal such as magnesium and silver or an alloy thereof at a thickness which permits visible light to pass therethrough. Alternatively, the second electrode 362 may be formed by using a conductive oxide transmitting visible light, such as ITO and IZO, with a sputtering method and the like. With this structure, the emission from the EL layer 354 can be extracted through the second electrode 362.

Next, the passivation film 370 is formed over the light-emitting element 350 (FIG. 22B). As shown in FIG. 22B, the passivation film 370 may possess a three-layer structure, for example. Such a structure can be formed as follows. First, the first layer 372 is formed over the second electrode 362. The first layer 372 may include an inorganic compound such as silicon nitride, silicon oxide, silicon nitride oxide, and silicon oxynitride and can be formed with a method the same as that of the undercoat 318. Sequentially, the second layer 374 is formed. The second layer 374 may contain an organic resin including an acrylic resin, a polysiloxane, a polyimide, or a polyester. Furthermore, as shown in FIG. 22B, the second layer 374 may be formed so as to have a thickness which absorbs projections and depressions caused by the partition wall 342 and provides a flat surface. The second layer 374 can be formed with the aforementioned wet-type film-formation method. Alternatively, the second layer 374 may be formed by atomizing or gasifying oligomers serving as a raw material of the aforementioned polymers under a reduced pressure, spraying the first layer 372 with the oligomers, and then polymerizing the oligomers. After that, the third layer 376 is formed (FIG. 22B). The third layer 376 may have the structure which is the same as that of the first layer 372 and can be formed with the method which is the same as that of the first layer 372.

The passivation film 370 having such a structure exhibits a high gas-barrier property, by which entrance of impurities such as water and oxygen to the light-emitting element 350 can be prevented and high reliability can be provided to the display panel 300.

After that, the opposing substrate 304 is fixed over the passivation film 370 by using the adhesion layer 380 (FIG. 8). An epoxy resin and the like can be used for the adhesion layer 380. Through these processes, the display panel 300 is prepared.

After that, as described in the Second Embodiment, the display device 100 is manufactured by fixing the display panel 300 over the touch sensor 200 (FIG. 7).

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

In the specification, although cases of the organic EL display device are exemplified, the embodiments can be applied to any kind of display devices of the flat panel type such as other self-emission type display devices, liquid crystal display devices, and electronic paper type display device having electrophoretic elements and the like. In addition, it is apparent that the size of the display device is not limited, and the embodiment can be applied to display devices having any size from medium to large.

It is properly understood that another effect different from that provided by the modes of the aforementioned embodiments is achieved by the present invention if the effect is obvious from the description in the specification or readily conceived by persons ordinarily skilled in the art.

What is claimed is:

1. A touch sensor comprising:
a plurality of first wirings arranged in a stripe shape and extending in a first direction; and
a plurality of second wirings and a plurality of third wirings arranged in a stripe shape, extending in a second direction, and alternating with each other, wherein
the plurality of first wirings is woven with the plurality of second wirings and the plurality of third wirings,
the plurality of first wirings and the plurality of second wirings comprise:
a first core including a conductive material and having a first curvilinear surface; and
a first clad covering an entire area of the first curvilinear surface; and including an insulating material, and
the plurality of third wirings comprises a second core, second clad, and a third clad,
the second core includes a conductive material and has a second curvilinear surface,
the second clad covers an entire area of the second curvilinear surface, includes an insulating material, and has a third curvilinear surface,
the second core is disposed without being in contact with the third clad, and
the third clad covers an entire area of the third curvilinear surface and includes a conductive material.

2. The touch sensor according to claim 1, wherein the insulating material of the second core is an elastomer.

3. The touch sensor according to claim 1, wherein:
a cross-sectional shape of the first core is circular, elliptical, square, or trapezoidal, and
a cross-sectional shape of the second core is circular, elliptical, square, or trapezoidal.

4. The touch sensor according to claim 1, wherein the plurality of first wirings are plain-woven, twilled, or stain-woven with the plurality of second wirings and the plurality of third wirings.

5. A display device comprising:
a display panel; and
the touch sensor according to claim 1.

6. The touch sensor according to claim 1, wherein
the second core and the third clad do not physically contact each other.

* * * * *